US009086047B2

(12) United States Patent
Salehpoor

(10) Patent No.: US 9,086,047 B2
(45) Date of Patent: Jul. 21, 2015

(54) RENEWABLE ENERGY EXTRACTION DEVICE

(76) Inventor: Karim Salehpoor, Albuquerque, NM (US)

( * ) Notice: Subject to any disclaimer, the term of this patent is extended or adjusted under 35 U.S.C. 154(b) by 248 days.

(21) Appl. No.: 13/564,700

(22) Filed: Aug. 1, 2012

(65) Prior Publication Data

US 2013/0069369 A1    Mar. 21, 2013

Related U.S. Application Data

(60) Provisional application No. 61/627,069, filed on Sep. 17, 2011.

(51) Int. Cl.
| | | |
|---|---|---|
| *F03B 13/00* | (2006.01) | |
| *H02P 9/04* | (2006.01) | |
| *F03B 7/00* | (2006.01) | |
| *F03B 11/02* | (2006.01) | |
| *F03B 13/26* | (2006.01) | |

(52) U.S. Cl.
CPC . *F03B 7/00* (2013.01); *F03B 11/02* (2013.01); *F03B 13/264* (2013.01); *F05B 2210/16* (2013.01); *F05B 2240/133* (2013.01); *F05B 2260/4031* (2013.01); *F05B 2260/421* (2013.01); *Y02E 10/223* (2013.01); *Y02E 10/226* (2013.01); *Y02E 10/28* (2013.01)

(58) Field of Classification Search
USPC .......................................... 290/54, 43; 415/7
See application file for complete search history.

(56) References Cited

U.S. PATENT DOCUMENTS

| | | | |
|---|---|---|---|
| 3,973,864 A | 8/1976 | Atherton | |
| 4,001,596 A | 1/1977 | Kurtzbein | |
| 4,220,870 A * | 9/1980 | Kelly | 290/44 |
| 4,268,757 A | 5/1981 | Rogers | |
| 4,352,990 A | 10/1982 | Aucoin, Jr. | |
| 4,511,808 A * | 4/1985 | Jost | 290/54 |
| 4,725,195 A * | 2/1988 | Wiggs | 415/7 |
| 4,868,408 A | 9/1989 | Hesh | |
| 5,105,094 A | 4/1992 | Parker | |
| 7,223,137 B1 * | 5/2007 | Sosnowski | 440/3 |
| 7,465,147 B2 * | 12/2008 | Platt et al. | 415/7 |
| 7,753,644 B2 | 7/2010 | Krippene | |
| 7,862,292 B2 | 1/2011 | Patterson | |
| 7,969,034 B2 | 6/2011 | Winius | |
| 8,197,206 B2 * | 6/2012 | Sundermann | 416/17 |
| 8,395,276 B2 * | 3/2013 | Freda | 290/54 |

* cited by examiner

*Primary Examiner* — Javaid Nasri

(57) ABSTRACT

Disclosed is a renewable energy extraction device and methods for producing renewable energy from flowing air or water. The renewable energy extraction device captures a relatively large amount of flowing water or atmospheric air and increases speed of the captured water or air by decreasing flow cross sectional area in the flow direction. An energy extraction component is used to extract energy of the high-speed water or air and convert it to rotational mechanical energy on a power shaft. A rotation direction control mechanism is used to make the power shaft always rotate in one direction, without coming to a stop, for ocean applications. The mechanical energy of the power shaft is transmitted to an electric generator, pump, compressor, or any other rotary equipment. After extraction of its energy, the captured air or water is released to its original source at a downstream location.

20 Claims, 21 Drawing Sheets

RENEWABLE ENERGY EXTRACTION DEVICE

CROSS REFERENCE TO RELATED APPLICATIONS

This Application claims Priority of Patent Application Ser. No. 61/627,069 filed on Sep. 17, 2011.

BACKGROUND OF THE INVENTION

1. Field of the Invention

The present invention relates to a renewable energy extraction device for water or wind applications. The renewable energy extraction device captures a relatively large amounts of flowing water (from ocean, sea, lake, pond, river, stream, ditch, or a canal) or atmospheric air (wind) and increases speed of the captured water or air by decreasing flow cross sectional area in the flow direction. Screen(s) or screening device(s) are used to remove any floating and undesired object from the captured water or air. A relatively small energy extraction component is used to extract energy of the high-speed water or air and convert it to rotational mechanical energy on a rotating shaft (power shaft). A rotation direction control mechanism is used to make the power shaft always rotate in one direction, continuously and without coming to a stop, for situations in which water flow direction may change from time to time. The extracted power is transmitted to an electric generator, pump, compressor, or any other rotary equipment as desired. The captured water or air is finally released to its original source at a downstream location.

2. Description of the Prior Art

Fossil fuels resources are limited and insufficient for the support of long term industrial and technological developments. On the other hand, uncertainties associated with the supply of fossil fuels have had negative impact on global economy for decades. Energy from wind and water has been supplementary to that of fossil fuels. Horizontal-axis wind turbines have been used to convert wind energy into electrical power with practical and industrial applications; however, current horizontal-axis wind turbines are expensive and huge in size. Because of their large sizes, relatively sophisticated facilities are needed for their manufacturing. Moreover, transportation to the location of use, installation, and repair & maintenance of such wind turbines is expensive and requires special equipment and techniques which cannot be afforded by individual customers such as ranchers and farmers. Producing electrical power of industrial and practical importance from water is limited to building hydroelectric power plants, which requires construction of dams over rivers in mountainous areas. Building a dam is time consuming and expensive. Moreover, natural disasters, such earthquakes, can cause damage to dams, thus put the adjacent communities in danger. Water wheels have been used to produce electrical power from rivers, however, at an insignificant rate and with no practical application. Similarly, there is not any industrial, practical, and economical method or device to capture energy from water in oceans or seas at a significant rate.

U.S. Pat. No. 7,969,034 B2 describes a minimal maintenance paddle wheel electric generation device for producing no cost electricity which includes an A-frame base disposed in a fast flowing stream with a paddle wheel mounted between A-frame supports, with the supports resting on the bade, and the paddle wheel including radially arranged dip blades with the rotation of the paddle wheel by the swiftly running water turning a drive gear that engages a series of reduction gears that, in turn, actuate a generator for producing electricity. A pair of paddle wheels can be ganged together on several floating members with the floating members tethered by cables to stanchions fixed on opposed banks of the stream. The paddle wheel can also be supported on buoyant inflatable tubes that have curvilinear members attached to the rear ends for directing water into the channel formed between the tubes thereby enhancing water flow and the angular speed of the paddle wheel for increased power generation.

The paddle wheel electric generation device, described above, is intended only for disposition in a naturally existing hard-flowing stream and is not intended to collect a large amount of flowing water from any stream or river, generate a hard-flowing stream, and capture the energy of the generated hard-flowing stream. In an alternative embodiment, a pair of inflatable tubes have used as the mounting or supporting means for the paddle wheel generation device, with a curvilinear member attached to each Inflatable tube, so that as a portion of water flows between the curvilinear members and the inflatable tubes, water's flow velocity increases thereby striking the dip blades with greater force. As the inflatable tubes, and curvilinear members attached to them, do not cover the entire depth of the water stream, this combination can capture energy only from the surface water, not from all the water flowing in the stream. Moreover, as the entire paddle wheel electric generation device is mounted and supported on two inflatable tubes, indicates that this system can be used only for small paddle wheels thus it cannot be used for large scale power generation. Furthermore, this patent claims only capturing energy of the naturally hard-flowing streams; it does not have a claim to generate a hard-flowing stream before capturing its energy. Finally, this patent does not claim any method to generate a hard-flowing stream before capturing water energy. There is not any screening means to protect the paddle wheel electric generation device against possible floating objects carrying by the stream. Also, there is not any means of shutting down the paddle wheel electric generation device for repair and maintenance periods. It should also be noted that the electrical main or cable of the paddle wheel electric generation device, which is used to connect the generator to the existing electrical grid system, extends outwardly through the main drive shaft. This is in violation of engineering practice and is a serious safety issue as the current carrying cable may come into physical contact with the main drive shaft electrically, thus with all the components of the paddle wheel electric generation device if these components are made from metal.

U.S. Pat. No. 4,868,408 describes a portable water-powered electric generator unit which has a tubular form with opposite open inlet and outlet ends defining a longitudinal flow path for the moving stream water. The tubular form defines a converging venturi terminating at a throat between the inlet and outlet ends. An electric dynamo, having a sealed housing and external driving propeller means, is supported in the flow path downstream of the throat, with the propeller means at the throat. The inlet end is between 2-5 times larger in area than the venturi throat, to speed up the water passing through the propeller means. The tubular form and housing together define a diverging venturi downstream from the throat, decelerating the water with minimal losses before exiting from the open outlet end. The open outlet end is 1.1-1.5 times larger in area than the open inlet end, whereby the slightly faster surrounding stream water blending with the exiting water at the open outlet end may tend to accelerate the exiting water slightly for added efficiencies. A buoyancy chamber, with remotely operated valve and gas pressure means, is on the portable electric generator unit to regulate its overall buoyancy, for adjusting its operative depth of use in the stream.

The portable water-powered electric generator unit, described above, is intended to be a portable device that can be carried by a person, thus it is not for large scale electric power generation. On the other hand, the device needs a source of compressed air and compressor or electricity to operate a control valve which is used to alter depth of the device in water. These features, in addition to routing the control and transmission lines under the water, make the cost of the power that can be generated by a portable device expensive and also necessitate some degree of technical expertise to operate and maintain the device continuously. Moreover, having the dynamo housing and its supporting radial vanes in water flow path have a negative impact on water velocity flowing through the device.

U.S. Pat. No. 4,352,990 describes a water powered electric generator for efficiently converting the power of running water to useful electrical energy; the apparatus including a pair of floating pontoons anchored in a running stream, and between which a plurality of paddle wheels, rotated by the water, drive a gear mechanism connected to an electric generator, and ducts under the pontoons converging toward the paddle wheels, for concentrating more water flow thereto.

The water powered electric generator, described above, uses multiple paddle wheels, with a complicated power transmission mechanism, to generate electricity from water running in a single channel formed between a pair of stationary pontoons. Use of multiple paddle wheels makes the water powered electric generator expensive for the amount of electricity that can be produced. While concentrating flow by narrowing the flow channel has not been included in the claim, it is suggested to narrow the flow channel only by a factor of two; if the water powered electric generator is intended to cover the entire river span, the throat size and the width of each paddle wheel become as half as the river span, making the device an impractical option. Also, endless belts, that are used to transmit power, can transmit a limited power, making the water powered electric generator inappropriate for large scale power generation. On the other hand, in rivers with ordinary water velocities, a single unit with a small narrowing ratio of two cannot produce sufficient electric power even for individual families. Moreover, the water powered electric generator is floating in water, thus it does not take advantage of the total depth of the running water. There is not any screening component, thus objects floating in water can damage paddle wheels and disrupt power generation. When angular ducts are added to the design, they allow escaping of water from the paddle area rather than directing more water into the paddle; this is because flowing water chooses the path with least resistance, thus flows outside the paddle area. As a result, the angular ducts will have a negative impact on function of the device. Therefore, this device is expensive, complicated, cannot function without frequent disruption, and is not appropriate for large scale power generation.

U.S. Pat. No. 4,268,757 describes a water wheel electric generation device as an improved water powered electric generating device which comprises a buoyant platform and a plurality of pylons fixedly mounted in the ocean or riverbed and which slidingly engages the buoyant platform, and a tower means fixedly mounted to the buoyant platform and upwardly extending therefrom. Axle means are rotatable about an axis and pivotedly adapted to the tower means and include means to rotate the axle means in an arc of substantially 120°, connected on one end to the tower means and on the other end to the axle means. The axle means and a plurality of radially and outwardly directed paddle arms are fixedly mounted to the first gear means and formed at the outward end thereof into a paddle to engage the moving water and rotate the first gear means. Pinion gear means toothedly engage the first gear means and are rotated thereby, and generator means are adapted to the pinion gear means and activated thereby to produce electricity.

Structure of the water wheel electric generation device, described above, is impractical for power generation at small scale. On the other hand, the device does not have means of directing large amounts of flowing water towards the paddles; thus magnitude of the generated power can be increased only by increasing the paddle size. Therefore the water wheel electric generation device is not practical and appropriate for power generation at large scale either. Also, the device is not equipped with any means for shutting down for repair and maintenance intervals.

U.S. Pat. No. 4,001,596 describes a wave and current operated power generating device as a pair of hull portions connected in spaced parallel relation supporting a water wheel and forming a passageway there between for driving engagement of flowing water against the vanes of the water wheel. The water wheel is made up of a pair of wheel portions having peripheral gear teeth, and these teeth are engageable with gears which drive electric generators. The vanes of the water wheel are adjustable to vary the driving power thereof and have nozzles thereon arranged to discharge water under pressure to provide a boost for the wheel. A brake is provided to control rotation of the water wheel, and an auxiliary engine is provided to drive the water wheel when necessary. The longitudinal hull portions support a gate mechanism at the inlet end of the water passageway to control the flow of water through such passageway and have air chambers to buoyantly support the device. The device has vertically extendable legs for ground support.

The wave and current operated power generating device, described above, has a complex structure, it is impractical, and is too expensive to be used for power generation at small scale for individual families. Also, while widening water intake is mentioned in description, such feature is not a main focus of the design and is not included in the claims. The device, therefore, lacks means of directing a large amount of water towards the paddle wheel, thus it cannot produce electrical power at large scale with a practical paddle wheel size.

U.S. Pat. No. 3,973,864 describes a wave motor that is comprised of two or more parallel rotors having apertured radial paddle elements with hinged flaps or blades covering the apertures such that upon the impingement of water upon one side of the paddles the blades cover the apertures and the wheel is turned, but upon impingement of water against the other side of the paddles the blades swing open. Each pair of rotors are coaxially mounted and designed for rotation in opposite directions to maximize extracted power regardless of the predominant current direction, and a single take off shaft is coupled to the rotors through a ratchet and gear mechanism.

The wave motor, described above, does not have means of directing large amounts of flowing water towards the rotor; thus magnitude of the generated power can be increased only by increasing the width of the rotor. Therefore the wave motor is not practical and appropriate for power generation at large scale. Also, because of different depths of flow in the two opposite directions, each rotor may be subjected to a different torque. This results in different rotational speeds of rotors. The gear box will not function properly if rotors intend to rotate the single gear at different speeds.

U.S. Pat. No. 7,753,644 describes a vertical axis multi-phased wind turbine power generating system. An adjustable air scoop directs air from a first phase of the prevailing wind into an air turbine for efficient power generation. An exit section, which uses a second phase of the prevailing wind in combination with an optional and adjustable exit section drag curtain or barrier, provides for efficient re-entertainment of this first stage of power generating air back into the downstream prevailing wind. The adjustable air scoop and adjustable exit drag curtain or barrier, where utilized, is automatically rotated in a self correcting manner to be suitably and optimally oriented to the prevailing wind direction. The design provides for a second stage of power generation to be accomplished by additionally utilizing a portion of the second phase of prevailing wind to directly or indirectly drive the turbine in a second stage of power production.

The vertical multi-phased wind turbine system, described above, has a complex design and cannot result in a practical product. The targeted produced power is limited to 50 kW of power, thus it is not intended for large scale power generation. Narrowing air flow path and using a relatively small size turbine have not been listed as claims.

U.S. Pat. No. 5,105,094 describes a method and apparatus for converting wave motion into an alternative energy source. The apparatus comprises a main water pipeline, a water inlet for directing water into the main water pipeline from a plurality of water inlet positions along a path in the direction of wave propagation. A vertical water flow riser is connected to, and receives water from, one end of the main water pipeline. The flow riser includes a cylinder and sealed piston arrangement, the piston movable upwardly in the cylinder responsive to the positive pressure of incoming water beneath the piston, and movable downwardly in the cylinder under the influence of gravity acting on the cylinder and on the water in the cylinder beneath the piston. A drain is provided for allowing a regulated amount of water to drain from the main pipeline on the downward stroke of the piston. The piston is coupled to an energy conversion means for producing an alternate energy output on both the upward and downward strokes of the piston.

For the method and apparatus, described above, a large number of individual water inlets, with their associated piping, should be used to produce energy at a significant rate. This makes the above method and apparatus impractical. Also, collected water from all inlets acts on a single piston to move it upwardly. This is another weakness of the above patent as there is a practical limit on the size of the diameter of the single piston which makes this patent not suitable for energy production at a significant rate. Further, a single drain is used to drain a large amount of water from the system to allow the piston move downwardly. Unless the size of the drain is very large, the downward stroke of the piston will be very slow, which will be a limiting factor on the magnitude of the stroke. Finally, the patent description indicates that the above method and apparatus can be used only in coastal areas.

U.S. Pat. No. 7,862,292 describes a horizontal motion wave power generator which is situated on the ocean shore for converting shore waves to unidirectional rotational force for generating power. By the use of a pair of one-way clutches on a single power shaft the incoming and outgoing motion of ocean waves is converted into continuous unidirectional rotational force to drive an electric generator. The generator system is attached to a base having troughs. The lower portions of the paddle wheels are positioned in the troughs, and engage incoming and outgoing shore waves which rotate the axle of the paddle wheels in a clockwise and counterclockwise direction. The one-way clutches convert the bi-directional rotation of the paddle wheel axle to unidirectional rotation of the power shaft.

The horizontal motion wave power generator, described above, does not collect a large amount of water; the energy that it can produce is limited to the width of the paddle wheels. Therefore, this generator cannot generate power at a significant rate. Also, paddle wheels are fixed to a drive axle which transmits power to the power shaft. The used arrangement, while results in a unidirectional rotation of the power shaft, makes the power shaft to come to a stop each time that wheel's direction of rotation changes. Therefore, the rotational speed of the power shaft oscillates between zero and a maximum value making the horizontal motion wave power generator inefficient in capturing wave energy. Further, the horizontal motion wave power generator is practical only for use in the ocean shore and not for deep water.

SUMMARY OF THE INVENTION

The present invention is a renewable energy extraction device, for water and wind applications, that can be used as a portable or stationary standalone power generator or be connected to a power network. The device captures a relatively large amounts of flowing water (from ocean, sea, lake, pond, river, stream, ditch, or a canal) or atmospheric air (wind), uses screen(s) or screening device(s) to remove any floating and undesired substances from the captured water or air, and increases speed of the captured water or air by decreasing flow cross sectional area in the flow direction. A relatively small size energy extraction component is used to extract energy of the high-speed water or air and convert it to rotational mechanical energy on a rotating shaft (power shaft). The extracted power is transmitted to an electric generator, pump, compressor, or any other rotary equipment as desired. After extraction of power, the captured water or air is released to the original source of air or water at a downstream location. A rotation direction control mechanism is used to make the power shaft always rotate in one direction, continuously and without coming to a stop, for situations in which water flow direction may change from time to time.

It is therefore a primary object of the present invention to provide a renewable energy extraction device that uses a relatively small size energy extraction component, such as a paddle wheel, water turbine, or axial-flow single stage or multiple stage air turbine, to extract energy from a relatively large amount of flowing water or air.

It is another object of the present invention to provide a renewable energy extraction device that converts energy of a relatively large amount of flowing water or air to rotational mechanical energy on a rotating shaft (power shaft).

It is a further object of the present invention to provide a renewable energy extraction device that uses a simple rotation direction control mechanism so its power shaft always rotates in the same direction, continuously and without coming to a stop, for any direction of flow of water through the device.

It is still another object of the present invention to provide a renewable energy extraction device that transmits the mechanical energy of the rotating shaft (power shaft) to an electric generator, pump, compressor, or any other rotary equipment as desired.

It is still a further object of the present invention to provide a renewable energy extraction device that has a simple and practical design, can be built with no need to sophisticated manufacturing facilities, can be built in different sizes to produce energy for small or large scale applications, can be used as a portable or stationary power generator, built into the ground or floating on water, standalone power generator or a generator to be connected to a power network, can be used to extract wind energy efficiently, can be used to extract energy from river efficiently, and can be used to extract energy from ocean, sea, or a lake efficiently.

DETAILED DESCRIPTION OF THE INVENTION

1. Definitions

River application as used herein shall mean an application in which water, its energy is extracted, flows in one direction, such as flow of water in rivers, canals, ditches, and streams.

Ocean application as used herein shall mean an application in which water, its energy is extracted, may approach the renewable energy extraction device from any direction, such as in flow of water in oceans, seas, lakes, and ponds.

Water application as used herein shall mean an application that applies to both river and ocean applications.

Air application as used herein shall mean an application in which atmospheric air, its energy is extracted, may approach the renewable energy extraction device from any direction.

2. Best Mode of the Invention

Figure 3:
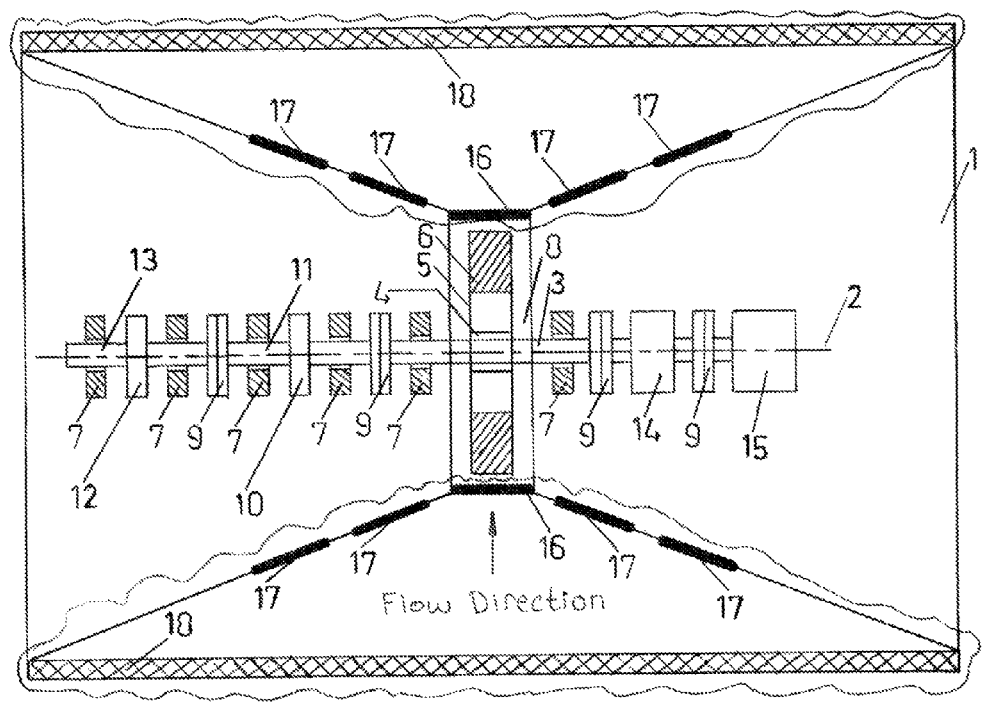
FIG. 3 is a schematic of the top view (with sectional cuts at inlet and exit compartments) of the simplified renewable energy extraction device that can be used to extract energy from water.
Figure 7:
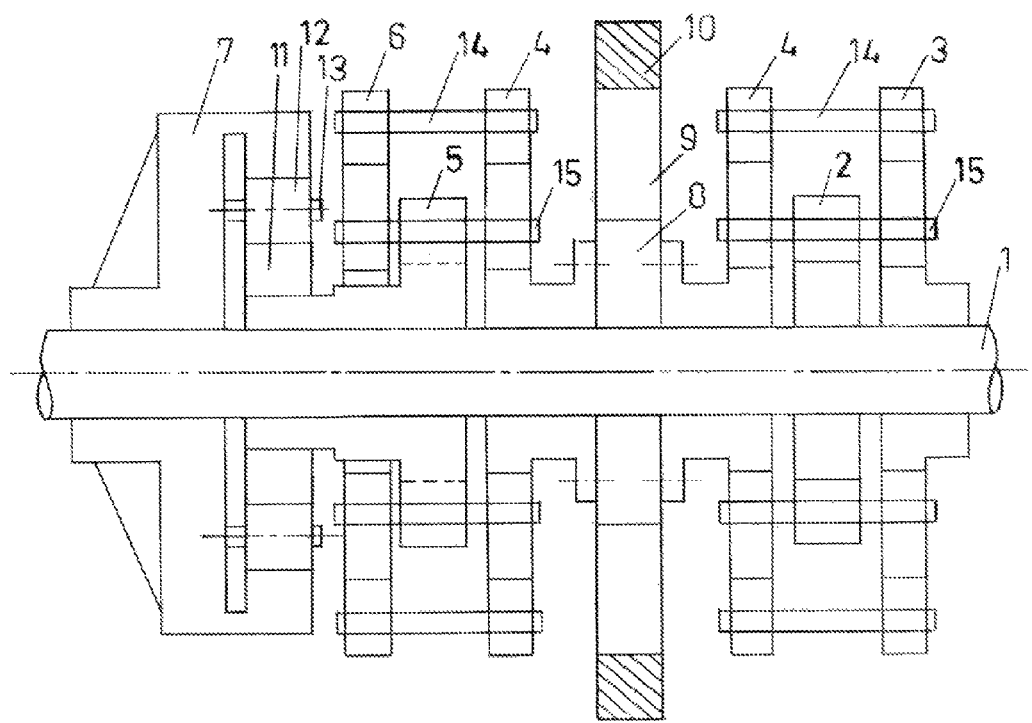
FIG. 7 is a schematic of the rotation direction control mechanism which is used in ocean applications.
Figure 17:
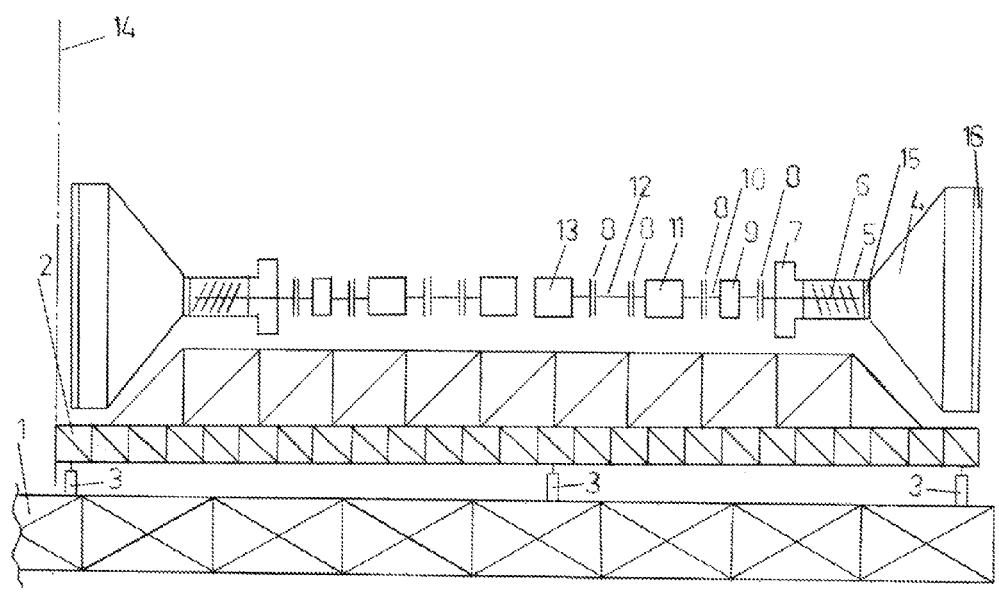
FIG. 17 is schematic of two identical units of renewable energy extraction devices for wind application, with stationary and rotary structures, that can be used to extract energy from flowing air.

FIG. 3 shows a top view of the best mode of the renewable energy extraction device to be used for river applications. FIG. 3 combined with FIG. 7 show the best mode of the renewable energy extraction device to be used for ocean applications. FIG. 17 shows the best mode of the renewable energy extraction device to be used for air applications.

3. General Description of the Invention

As can be seen from the drawings, the renewable energy extraction device has an inlet compartment, with a relatively large opening and reducing cross sectional area in the flow direction. It captures a relatively large amounts of flowing water or air and increases its speed as it flows through the inlet compartment. The high-speed water or air is then directed to a high-speed flow compartment, where it transmits its energy to the rotating shaft (power shaft) by the use of an energy extraction component such as water turbines, paddle wheels, and single or multi-stage axial-flow air turbines as desired. Multiple high-speed flow compartments, with multiple energy extraction components, may be used with single inlet and exit compartments, if desired. By reducing the flow cross sectional area before extracting energy from water or air, a smaller and more compact energy extraction component may be used, thus it will be much easier and economical to build, operate, and maintain the energy extraction component of a renewable energy extraction device.

After transmitting energy to the energy extraction component in the high-speed flow compartment, water or air is then directed to an exit compartment, through which it is released to the original source of water or atmospheric air again. Multiple high-speed flow compartments, with multiple energy extraction components, may be used with a single exit compartment, if desired.

For ocean applications, the renewable energy extraction device will be equipped with a rotation direction control mechanism that allows the power shaft always rotate in the same direction, continuously and without coming to a stop, independent of the direction of flow of water through the renewable energy extraction device.

When used to extract energy from flowing air, the renewable energy extraction device may be mounted on a rotary structure so it can be rotated and aligned with the wind direction.

The renewable energy extraction device for air application may be installed onshore or offshore. For offshore application, the renewable energy extraction device may be installed on a stationary structure at a desired location or it may be mounted on any floating structure (such as a barge-like structure) that is anchored by desired means in a desired location.

When used to extract energy from water, the renewable energy extraction device can be stationary and built into the ground with a desired orientation, or it can float on water, partially submerged in water as desired, thus allowing the renewable energy extraction device align itself with the direction of water velocity and move up and down as water level rises or recedes. In this case, the device will be equipped with desired attachments or anchoring means that keep the renewable energy extraction device in location while allowing it to move up and down with water level. This will allow the renewable energy extraction device to function continuously and with no interruption in case of alterations in water level.

All three inlet, high-speed, and exit compartments can be attached to a desired structure that is built with desired material(s). All or some portions of the inlet compartment, high-speed compartment, exit compartment, and the structure on which they are mounted, may be covered by rigid or foldable sheets from any material(s) as desired. Combination of the inlet, high-speed flow, and exit compartments with the structure and covering sheets is referred to as the platform of the renewable energy extraction device. The top portion of the platform is referred to as the upper platform, on which all instrumentation, rotary and non-rotary components, and equipment can be mounted, and provides working area for crew. The bottom portion of the platform is referred to as the lower platform and includes the inlet, exit, and high-speed flow compartments.

For river applications, the renewable energy extraction device can be built in small scale so it can be carried by one or two individuals and be anchored in a river or stream along the water line to produce electricity for an individual family living alongside the river or stream. Large scale version of the renewable energy extraction device can cover total or a portion of the river span extracting energy from total or a portion of the river flow rate to produce electric power in a scale that is comparable to the amount of electric power produced by conventional thermal or hydroelectric power plants. Multiple high-speed flow compartments, with multiple energy extraction components, may be used with single inlet and exit compartments, if desired. Therefore, the renewable energy extraction device can be used to produce electric power from a river with much reduced cost, much less construction time, in any spot along the river, and with no negative impact on communities living nearby, compared to building an expensive hydroelectric power plant that takes years to complete and can be built only in mountainous areas. Large size prototypes of the renewable energy extraction device can be built as mobile structures or into the ground and with any desired material(s) or combination of materials.

When direction of the water velocity changes with time, such as in ocean or sea, a very large prototype of the renewable energy extraction device for ocean application can be built into the ground with a desired configuration, or built on a floating, barge-like structure, that can align itself with the water velocity direction to produce mechanical or electrical power from flowing water in coastal or deeper areas as desired. By increasing the size of the opening of the inlet compartment, large amount of flowing ocean or sea water is captured by the inlet compartment, resulting in massive mechanical or electrical power production by the renewable energy extraction device. For ocean application, the renewable energy extraction device is equipped with the rotation direction control mechanism that allows the power shaft of the renewable energy extraction device always rotate in the same direction independent of the direction of flow of water through the device.

For air application, instead of using the current huge and expensive wind turbines that extract wind energy from air that flows with its natural speed, the use of the renewable energy extraction device allows continuous capturing of large amounts of flowing air through its inlet compartment that has a large opening, increases the speed of captured air as it passes through the inlet compartment that has a reducing cross-sectional area in the direction of flow, and uses a relatively small energy extraction component, which is a single or multi-stage axial-flow air or wind turbine, in the high-speed flow compartment to extract energy of the captured air as it moves with a high speed through the high-speed flow compartment. Therefore, compared to the current wind turbines, the renewable energy extraction device is a much more economical, affordable, efficient, and simpler device that can be used to extract wind energy. Also, the renewable energy extraction device requires less sophisticated manufacturing facilities and it is much easier to operate and maintain it compared to the current huge wind turbines.

Mechanical and electrical components such as couplings, bearings, flywheels, gears and gearboxes, shafts, transmission system, braking system, electric generators, and other mechanical, electrical, electronic, hydraulic, and pneumatic components can be used to assure safe operation of the renewable energy extraction device and transmission of the extracted power to an electric generator, electric power grid, or other rotary equipment as desired.

All compartments and components of the renewable energy extraction device may be built from any material or combination of materials, or coated with any material, and with any desired size or geometry. Bottom of the inlet, high-speed flow, and exit compartments may have the same level (elevation) or they may have different levels (elevations) relative to each other. Each of the inlet, high-speed flow, and exit compartments may be built as a single piece or assembly of multiple pieces for ease of transportation and installation.

4. How to Make the Water Embodiment of the Invention

Figure 1:
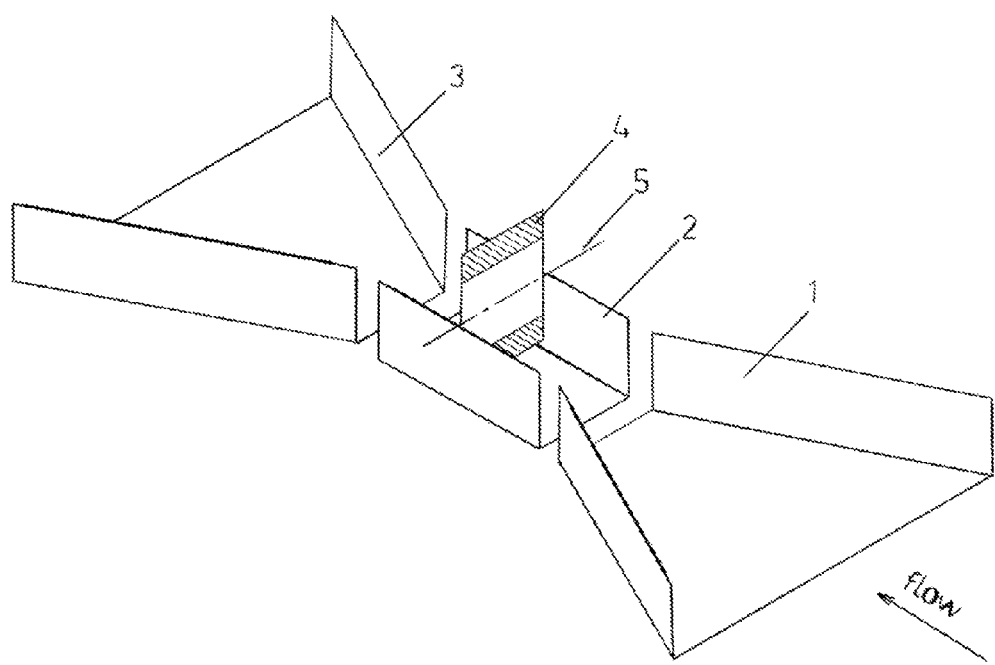
FIG. 1 is a schematic of a simplified renewable energy extraction device that can be used to extract energy from flowing water.

Shown in FIG. 1 are basic features of the renewable energy extraction device for water application. Cross sectional area of the inlet compartment 1 is reduced, with any desired pattern, in the flow direction. The inlet compartment can have any desired shape. Except at its inlet and outlet, the inlet compartment can have a closed contour, an open contour, or a combination of both.

Referring to FIG. 1, a screening device (not shown), such as screen(s) with desired mesh size(s), can be used with the inlet compartment, as desired, to prevent debris or any other undesired particles and objects from entering the renewable energy extraction device.

Referring to FIG. 1, water velocity reaches its maximum as it leaves the inlet compartment 1. High-speed water is then directed into the high-speed flow compartment 2, where its energy is transmitted to an energy extraction component, with its shaft referred to as the power shaft. High-speed flow compartment 2 can have any desired shape and dimensions. Except at its inlet and outlet, the high-speed flow compartment can have a closed contour, an open contour, or a combination of both.

Referring to FIG. 1, exit compartment 3 directs water to its original source, at a downstream location, after its energy is transmitted to the power shaft. Exit compartment 3 can have any desired shape and dimensions. Except at its inlet and outlet, the exit compartment can have a closed contour, an open contour, or combination of both.

Referring to FIG. 1, a screening device (not shown), such as screen(s) with desired mesh size(s), can be used with the exit compartment 3, as desired, to prevent debris or any other undesired particles and objects from entering the renewable energy extraction device.

Referring to FIG. 1, water energy extraction component 4 could be a water turbine or paddle wheel, in which paddles are mounted on the wheel structure (not shown). Paddles can have any desired geometry including flat, semispherical, or half-tube configurations. Paddles can be attached to the wheel with their axes at any desired angle and orientation. Paddles can be fixed on the wheel structure or they can slide on it. Wheel structure is attached to a wheel rotor (not shown) that is concentric with the power shaft (not shown). By sliding the paddles on the wheel structure, towards the axis of rotation, they can be pulled out of flowing water. Pulling the paddles out of water facilitates shutting down of the renewable energy extraction device for repair and maintenance operations. A combination of ropes, cables, chains, and pulleys (not shown) in any desired arrangement can be used to pull the paddles out of flowing water. The energy extraction component 4 can be enclosed, totally or partially, within the high-speed flow compartment 2.

Referring to FIG. 1, the axis of rotation 5 of the energy extraction component 4 can be parallel, perpendicular, or at any other desired angle with respect to the longitudinal axis of the high-speed flow compartment 2.

Referring to FIG. 1, height of walls of inlet, high-speed flow, and exit compartments may be constant or vary with any desired pattern. The walls may be straight or curved, or combination of both, and may make any desired angle with respect to a horizontal surface. Any of inlet, high-speed flow, and exit compartments may be built as a single piece or assembly of multiple pieces for ease of transportation and installation, from any material(s) or combination of materials, and coated with desired material(s).

Figure 2:
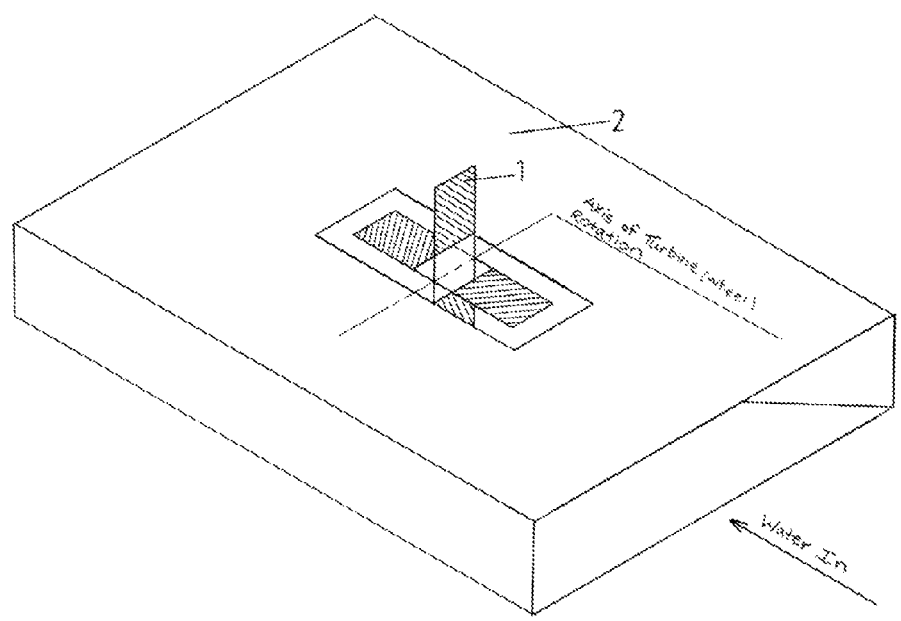
FIG. 2 is a schematic showing all three inlet, high-speed, and exit compartments of a renewable energy extraction device attached to a structure and covered with rigid or foldable sheets, as desired.

FIG. 2 shows all three inlet, high-speed, and exit compartments, of a renewable energy extraction device, that are attached to a structure and covered with rigid or foldable sheets as desired. The combination of the structure and covering sheets is referred to as the platform, on top of which all required instrumentation and rotary and non-rotary components and equipment (not shown) can be mounted. Walls of the inlet, high-speed flow, and exit compartments, combined with the covering sheets on the right and left sides of the platform, create sealed and empty spaces that help the renewable energy extraction device remain partially submerged in water, when desired. An attachment (not shown) can be used on the platform to keep it in place while allowing it to move up and down as water level is changed. Water energy extraction component 1 is a water turbine or paddle wheel as described in FIG. 1. All required equipment and instrumentation (not shown) can be mounted on the top surface of platform 2, the upper platform. Any of the inlet, high-speed flow, and exit compartments may be built as a single piece or assembly of multiple pieces, for ease of transportation and installation, from desired material(s) and coated with desired materials.

FIG. 3 shows a detailed schematic of the top view, with sectional cuts to show the inlet and exit compartments, of the renewable energy extraction device that can be used for water application. Protective shield(s) (not shown here) can be used to guard rotary components and the entire platform, if desired. Shown components and equipment may be arranged in any other order, if desired. Height of walls of inlet, high-speed flow, and exit compartments may be uniform or variable with any desired pattern. The walls may be straight or curved, or combination of both, and may make any desired angle with respect to a horizontal surface. Any of the inlet, high-speed flow, and exit compartments may be built as a single piece or assembly of multiple pieces, for ease of transportation and installation, from any material(s) or combination of materials, and coated with desired material(s). When the renewable energy extraction device is built over an entire river span, at least one small side canal or water way (not shown) can be built on each side of the renewable energy extraction device, along the river, to allow fish move freely from one side of the device to the other side without being trapped on either side.

Referring to FIG. 3, platform 1 is composed of the lower platform (which includes inlet, high-speed flow, and exit compartments) and the upper platform which are made from desired material(s) or combination of materials and are attached to desired structure(s) by welding, use of fasteners, or similar means.

Referring to FIG. 3, shown are power shaft 3 with its axis of rotation 2 and wheel rotor 4. For river application, wheel rotor 4 is engaged with the power shaft 3 by keys or other desired means, such as splines, and the two rotate together. For ocean application, where direction of velocity of the flowing water may change with time, wheel rotor 4 is idle (rotates freely) relative to the power shaft 3, however, wheel rotor 4 can still transmit power and rotation to power shaft 3 through the rotation direction control mechanism (not shown).

Referring to FIG. 3, wheel structure 5 is a structure, made from desired materials or combination of materials, and is attached to the wheel rotor 4 by welding or the use of fasteners. Paddles 6 are attached to the wheel structure 5 by welding or the use of fasteners. Paddles can be flat, hemispherical, half-tube, or have any other desired two or three-dimensional geometry. Paddles 6 can be fixed to the wheel structure 5 or allowed to slide on it. Sliding paddles makes it possible to pull the paddles towards the axis of rotation, thus pulling them out of flowing water in the high-speed flow compartment. Pulling paddles out of the flowing water facilitates shutting down the renewable energy extraction device for required repair and maintenance operations. A combination of desired components such as ropes, cables, chains, pulleys, and springs or other stretchable members (not shown) can be used to accommodate sliding of paddles 6 on the wheel structure 5 towards or away from the axis of rotation 2. Combination of the wheel rotor 4, wheel structure 5, and paddles 6 may be replaced by a water turbine such as a Pelton turbine. Two paddles 6 are seen in FIG. 3. Any other desired number of paddles may be used with the wheel structure 5, as desired.

Referring to FIG. 3, bearings 7 (that may be rolling-contact bearings, sleeve bearings, or a combination of both) are used to support rotary shafts in the high-speed flow compartment 8 and everywhere else when needed. Couplings 9 are used to connect two adjacent shafts when needed. Any desired type of flywheel 10, with its associated shaft 11, is used to store captured energy and minimize fluctuation in rotational speed of the power shaft 3 and other rotary components. Shown in FIG. 3 are also a brake system 12 and its associated shaft 13 that may be used for stopping the rotating shafts, if desired. Power shaft and shafts of all other rotary equipment are connected to each other, so stopping one shaft will result in stopping all of them. A transmission system 14 is used to adjust rotational speed of the rotating shafts and electric generator 15, as desired.

Referring to FIG. 3, the electric generator 15 is used to convert the extracted water power to electrical power, if desired, and transmit it to a power grid (not shown), if desired. Instead of the electric generator 15, the extracted water power can be transmitted to a pump, compressor, or any other rotary equipment (not shown), if desired.

Referring to FIG. 3, a flow restriction device 16, such as a sliding gate or other types of valves, may be used to prevent flowing water from entering into the high-speed flow compartment, if desired. The flow restriction device 16 is normally open but will be closed when it is necessary to shut down the renewable energy extraction device for maintenance and repair operations. Two such flow restriction devices 16 are shown at the inlet and exit of the high-speed flow compartment. The flow restriction devices 16, which can be operated manually or power driven by conventional means (not shown), can also be used to control water flow rate through the high-speed flow compartment, thus maintain a constant rotational speed on the power shaft 3 when electric load on the renewable energy extraction device is varied.

Referring to FIG. 3, flow restriction devices 17, which may be sliding gates or other types of valves, are used to divert water flow from the high-speed flow compartment during repair and maintenance operations. Flow restriction devices 17 are normally closed, but they will be open when the renewable energy extraction device is to be shut down. Eight of such flow restriction devices 17 are shown in FIG. 3. Any other desired number of such gates may be used as desired. The flow restriction devices 17 can be operated manually or power driven by desired means (not shown). The flow restriction devices 17 can also be used to control water flow rate through the high-speed flow compartment, thus adjust the rotational speed and power on the power shaft 3.

Referring to FIG. 3, screening devices 18, such as screen(s) with desired mesh size(s) are used to prevent birds, debris or any other undesired particles and objects from entering the renewable energy extraction device or the high-speed flow compartment 8. The screening devices 18 can be mounted at the inlet of the inlet compartment, inlet of the high-speed flow compartment, or anywhere in between. Similarly, the screening devices 18 can also be mounted at the outlet of the high-speed flow compartment, outlet of the exit compartment, or anywhere in between.

Referring to FIG. 3, spacer shafts (not shown) may be used, to transmit power between shafts of any two adjacent components or any two adjacent rotating shafts, for ease of installation and repair operations on desired components. Also, universal joints (not shown) may be used to transmit power from one rotating shaft to another if the two shafts do not have the same axis of rotation.

Figure 4:
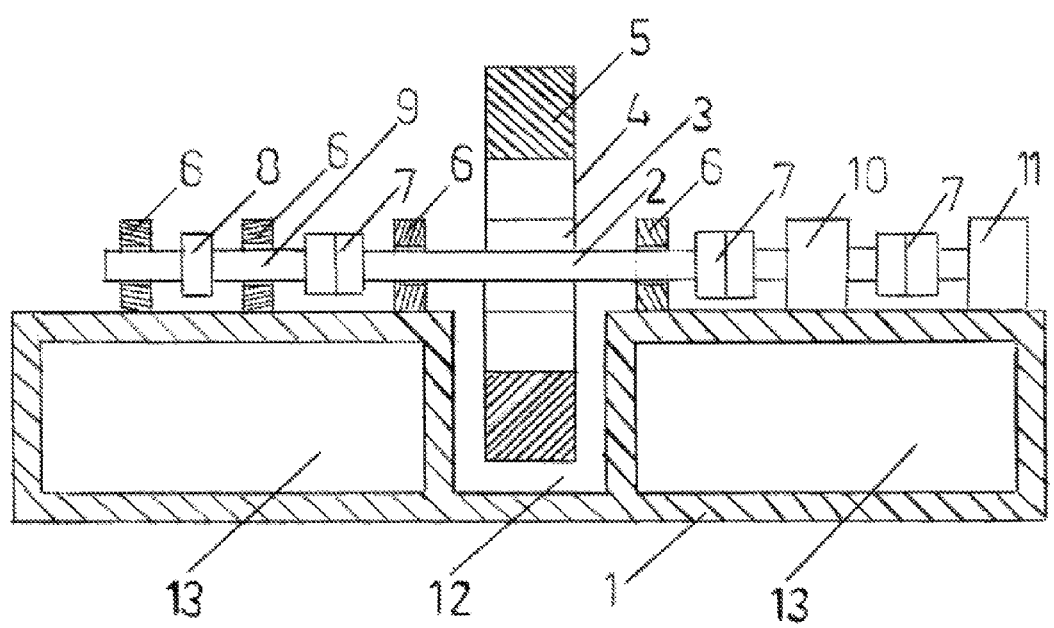
FIG. 4 is a schematic of the front view of the simplified renewable energy extraction device, with its associated components, that can be used for water application.

FIG. 4 shows front view of a simplified renewable energy extraction device (not all components are shown) that can be used for water application. Energy of the high-speed flowing water is converted to rotational energy on the wheel and is eventually transmitted to an electric generator, pump, compressor, or any other rotary equipment, as desired. A brake system (not shown) can be added for stopping the rotating shaft, if desired. Power shaft and shafts of all other rotary equipment are connected to each other, so stopping one shaft will result in stopping all of them. Protective shield(s) (not shown) can be used to guard rotary components and the entire platform, if desired. Shown components may be arranged in any other order, if desired. Height of walls of inlet, high-speed flow, and exit compartments may be constant or variable with any desired pattern. The walls may be straight or curved, or combination of both, and may make any desired angle with respect to a horizontal surface.

Referring to FIG. 4, platform 1 includes lower and upper platforms. The inlet, high-speed flow, and exit compartments with their associated covering rigid or foldable sheets make the lower platform. All required instrumentation as well as rotary and non-rotary components and equipment (not all of them are shown here) will be mounted on the upper platform which also provides working area for crew for repair and maintenance operations in a large scale renewable energy extraction device. Because of its height, the upper platform area will not be affected or flooded by rising water level. An attachment can be used on the platform (not shown here) to anchor it in a desired location while allowing it to move up and down as water level is changed. Any of inlet, high-speed flow, and exit compartments may be built as a single piece or assembly of multiple pieces, for ease of transportation and installation, from any material(s) or combination of materials, and coated with desired material(s).

Referring to FIG. 4, power shaft 2 is engaged with wheel rotor 3, by keys or other means such as splines, and the two rotate together for river application. For ocean application, where direction of velocity of the flowing water may change with time, wheel rotor 3 is idle (rotates freely) relative to the power shaft 2 but transmits power and rotation to the power shaft 2 by the rotation direction control mechanism (not shown).

Referring to FIG. 4, wheel structure 4 is a structure with desired size, shape, dimensions, and geometry and is made from desired materials. Wheel structure 4 is attached to the wheel rotor 3 by welding, use of fasteners, or other desired means. Paddles 5 can be attached to the wheel structure 4 by welding, use of fasteners, or other similar means. Paddles 5 can be flat, hemispherical, half-tube, or have any other desired two-dimensional or three-dimensional geometry; they can have any size and dimensions and made from any material(s) and coated with desired material(s). Paddles 5 can be fixed to the wheel structure 4 or they can slide on it. Sliding paddles 5 make it possible to pull the paddles towards the axis of rotation, thus out of water that is flowing in the high-speed flow compartment 12. Pulling paddles 5 out of the flowing water facilitates shutting down the renewable energy extraction device for required repair and maintenance operations. A combination of components such as ropes, cables, chains, pulleys, and springs or other stretchable members (not shown) can be used to accommodate sliding of paddles 5 on the wheel structure 4 towards or away from the axis of rotation. Combination of the wheel rotor 3, wheel structure 4, and paddles 5 may be replaced by a water turbine such as a Pelton turbine. Two paddles 5 are seen in FIG. 4; any other number of paddles 5 may be used with the wheel structure 4 as desired.

Referring to FIG. 4, bearings 6 (which may be rolling-contact bearings, sleeve bearings, or a combination of both) are used to support all rotary shafts of the renewable energy extraction device. Couplings 7 are used to connect two adjacent shafts together. Any desired type of flywheel 8 and its associated shaft 9 are used to store captured energy and minimize fluctuation in rotational speed of the power shaft 2 and other rotary components. Flywheel 8 is engaged with its shaft 9 by keys or other means such as splines. A transmission system 10 is used to adjust rotational speed of rotating shafts and electric generator 11, as desired. Instead of electric generator 11, extracted energy from the flowing water can be transmitted to a pump, compressor, or any other rotary equipment, if desired.

Referring to FIG. 4, empty and sealed spaces 13 are created by the walls of the inlet, high-speed flow, and exit compartments and the rigid or foldable covering sheets of the platform. Empty and sealed spaces 13 provide buoyant force that keeps the platform partially submerged in water, as desired. Spacer shafts (not shown) may be used, to transmit power between shafts of any two adjacent components or any two adjacent rotating shafts, for ease of installation and repair operations on desired components. Also, universal joints (not shown) may be used to transmit power from one rotating shaft to another if the two shafts do not have the same axis of rotation.

5. How to Make the River Application Embodiment of the Invention

Figure 5:
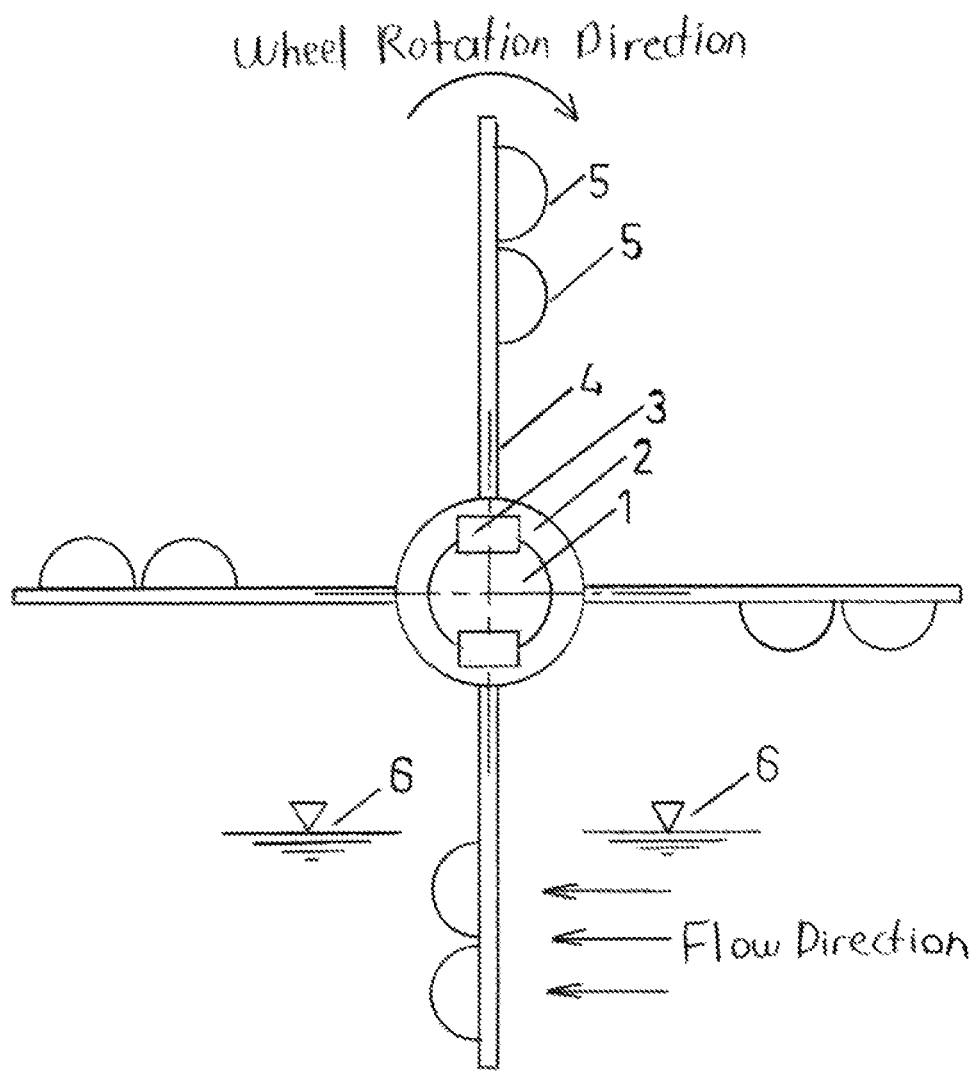
FIG. 5 is a schematic of a wheel with array of paddles that can be used for river applications.

FIG. 5 shows schematic of a wheel with array of paddles that can be used for river application. Power shaft 1 is engaged wheel rotor 2 by keys 3 or any other means such as the use of splines. When wheel rotor 2 rotates, the power shaft 1 rotates with it, too. Two keys are shown here in FIG. 5; any other number of keys may be used as desired. Keys 3 can be made with any desired material and with any desired size, shape, and geometry.

Referring to FIG. 5, wheel structure 4 is a structure or combination of structures, made from desired materials, attached to wheel rotor 2 by welding or the use of fasteners, as desired. When wheel rotor 2 rotates, wheel structure 4 rotates with it, too. The shown wheel structure 4 has four arms with two paddles 5 attached to each arm. Any desired number of arms, with any desired dimensions and geometry, and with any number of paddles 5 on each arm may be used. Additional structural members (not shown) may be used to connect adjacent arms together, as desired, to improve rigidity and integrity of the wheel structure. Paddles 5 can be flat, hemispherical, half-tube, or have any other desired two-dimensional or three-dimensional geometry; they can have any size and dimensions and made from any material(s) and coated with desired material(s). Two half-tube paddles 5 are shown on each arm of the wheel structure 4; any other number of paddles can be used on each arm, as desired. Paddles 5 may be attached to the arm of the wheel structure with their axis being parallel or perpendicular to the arm length, as desired. Paddles 5 are attached to the arm of the wheel structure 4 by welding, use of fasteners, or other desired means.

Referring to FIG. 5, paddles 5 can be fixed in their place or they can slide on the arm, if desired. When three dimensional paddles are used, minimum angular separation between adjacent arms will depend on the size (diameter of half-tube or hemisphere) of the paddles. The use of paddles with smaller diameter on each arm, allows the use of a smaller angular separation between adjacent arms, thus the use of more arms on the wheel structure. For normal operation of the renewable energy extraction device, water level 6 within the high-speed flow compartment is such that all paddles on an arm will be submerged in flowing water for efficient energy extraction by all paddles.

Figure 6:
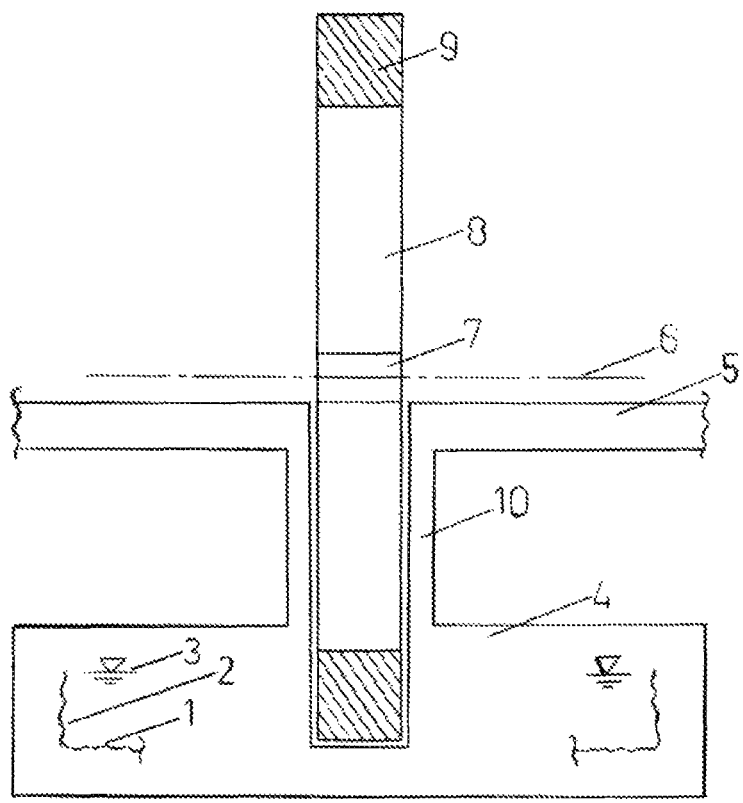
FIG. 6 is a schematic of a simplified, large size, massive renewable energy extraction device that can be used to extract energy from total water flow rate in a river.

FIG. 6 shows schematic of a simplified renewable energy extraction device (not all components are shown) that can be used over an entire river span to extract energy from total water flow rate in the river. Shown in FIG. 6 is natural river bed 1 and natural river water line or coast line 2 with water level 3 in the river. Lower platform 4 (which includes inlet, high-speed flow, and exit compartments) expands over the entire river span and is built partially into the ground. All other equipment and required instrumentation (not shown) can be mounted on the upper platform 5, which also serves as a working area for crew. Other ends of the upper platform 5 (not shown) may be attached to the lower platform 4, or they may be built into the ground. Wheel rotor 7, with axis of rotation 6, is engaged with the power shaft (not shown) by use of keys or other means such as splines, thus wheel rotor and the power shaft rotate together.

Referring to FIG. 6, wheel structure 8 is a structure made from desired material(s) by welding or the use of fasteners and is attached to wheel rotor 7 by welding or the used of fasteners. Paddles 9 can be attached to the wheel structure 8, with their axes at any desired angle and orientation, as desired. Paddles 9 can be fixed or sliding relative to the wheel structure 8. Two paddles 9 are shown in FIG. 6; any other number of paddles 9 can be used, as desired. Paddles 9 can be flat, hemispherical, half-tube, or have any other desired two-dimensional or three-dimensional geometry; they can have any size and dimensions and made from any material(s) and coated with desired material(s).

Referring to FIG. 6, lower platform 4 is connected to the upper platform 5 by a desired structure 10 that is made from desired materials or combination of materials. Height of walls of inlet, high-speed flow, and exit compartments may be constant or variable with any desired pattern. The walls may also make any desired angle with respect to a horizontal surface. Slope of the bottom surfaces of the inlet, high-speed flow, and exit compartments may be the same as the natural slope of the river bed or different from that. Bottom surfaces of the inlet, high-speed flow, and exit compartments may have the same or different elevations compared to each other or the natural river bed 1. Inlet, high-speed flow, and exit compartments as well as the structure 10 may be built from a combination of materials such as concrete, metal, and non-metal materials, as desired.

6. How to Make the Ocean Embodiment of the Invention

FIG. 7 shows schematic of the rotation direction control mechanism which is used in ocean application, where flow direction may change with time. This mechanism allows the power shaft of the renewable energy extraction device always rotate in one direction, continuously and without coming to a stop, independent of the direction of flow of water through the high-speed flow compartment. Direction of rotation of the energy extraction component (paddle wheel or water turbine) depends on the direction of flow velocity in the high-speed flow compartment of the renewable energy extraction device. When direction of flow is reversed in the high-speed flow compartment, the energy extraction component (paddle wheel or water turbine) has to come to a stop too, momentarily, before it changes its direction of rotation. Repeated coming to a stop for power shaft, corresponding to repeated change in the flow direction, results in an inefficient energy extraction process. The rotation direction control mechanism allows the power shaft of the renewable energy extraction device always rotate in one direction, continuously and without coming to a stop, when direction of flow of water in the high-speed flow compartment is reversed.

Referring to FIG. 3 and FIG. 4, when the energy extraction component (paddle wheel or water turbine) and its associated power shaft are replaced by the rotation direction control mechanism, which is seen in FIG. 7, the renewable energy extraction device will work properly for ocean application.

Referring to FIG. 7, power shaft 1 is made from a desired material and with desired shape and dimensions so it can transmit a desired power safely. Power shaft is supported by bearings (that may be rolling-contact bearings, sleeve bearings, or a combination of both) that are attached to the upper platform of the renewable energy extraction device. Power shaft 1 can have one diameter or different diameters at its different sections. Its axial movement is prevented or controlled by desired means. No individual drawing of power shaft 1 is provided.

Figure 8A:
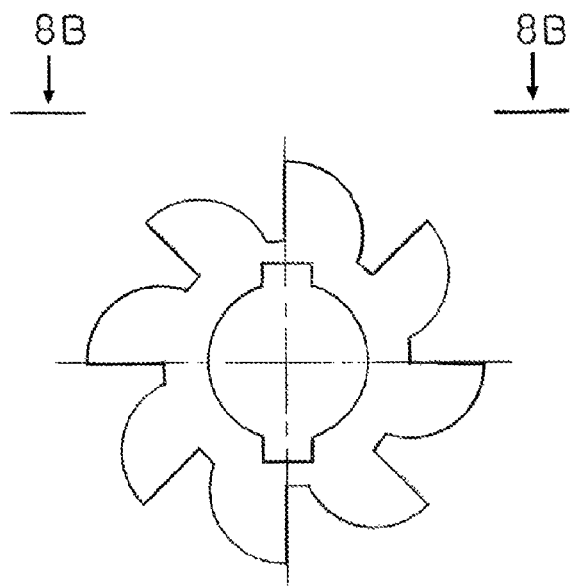
FIG. 8A and FIG. 8B are schematics of front and top views of the ratchet-like cylinder (component 2) as seen in FIG. 7.
Figure 8B:
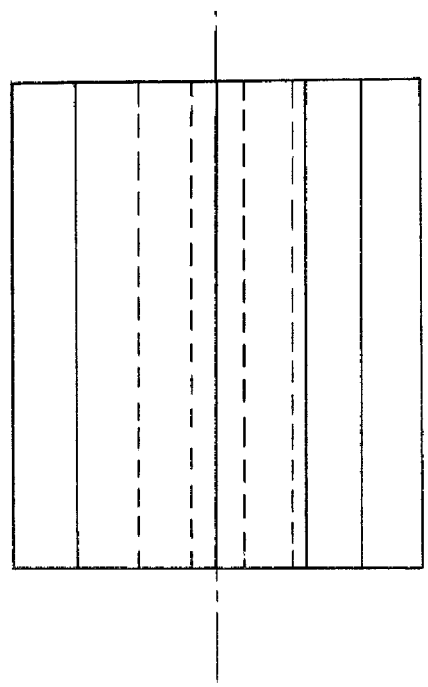

Referring to FIG. 7, the ratchet-like cylinder (component 2) can transmit rotation and power to power shaft 1 only in one direction. Structural details of the ratchet-like cylinder (component 2) are seen in FIG. 8A and FIG. 8B. The ratchet-like cylinder (component 2) is engaged with the power shaft 1 by keys or any other desired means, such as use of splines (not shown). Two keyways are shown in FIG. 8A and FIG. 8B; any other desired number of keyways can be used. When the ratchet-like cylinder (component 2) is rotated, it transmits rotation and power to the power shaft 1. Some or all surfaces of the ratchet-like cylinder (component 2) may be covered by plastic or rubbery pads or any other noise absorbing material(s) to absorb noise that is due to metal-to-metal contact, as desired.

Figure 9A:
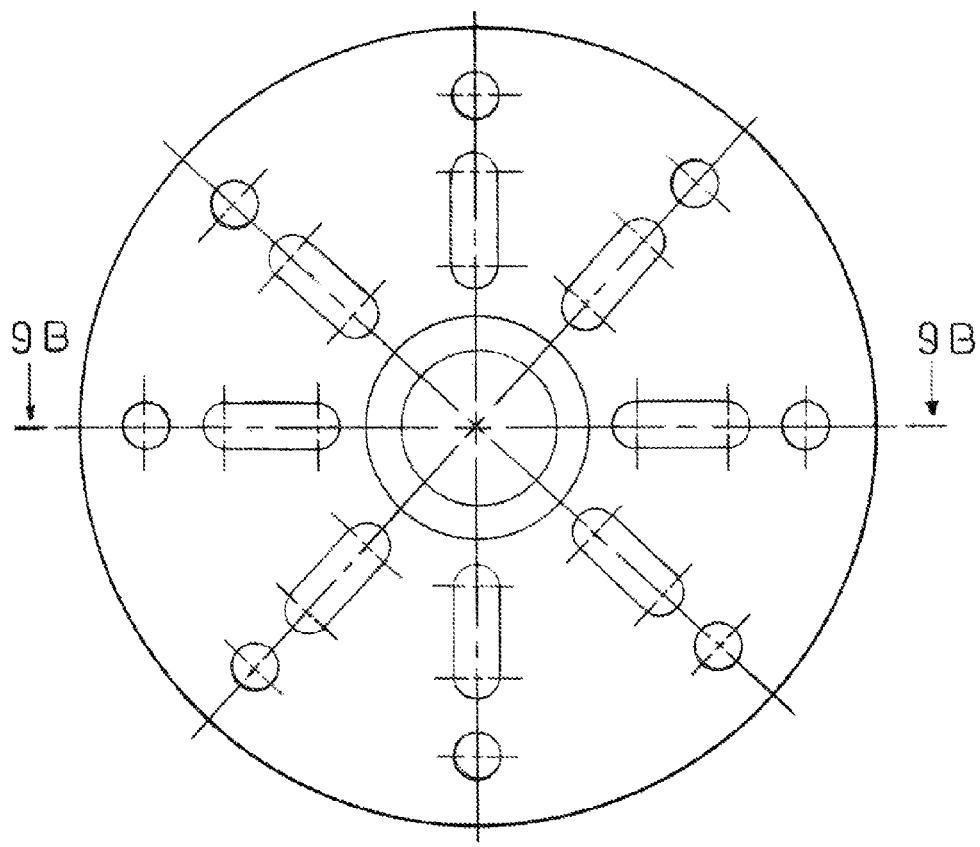
FIG. 9A and FIG. 9B are schematics of front and top views of the slotted cylinder (component 3) as seen in FIG. 7.
Figure 9B:
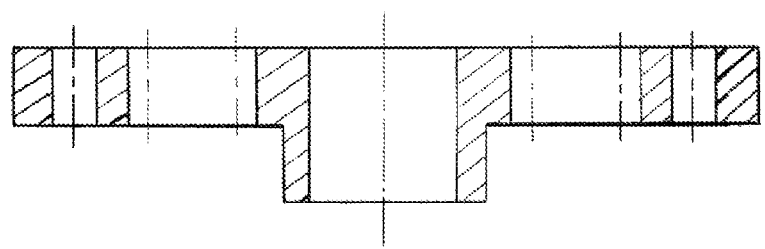

Referring to FIG. 7, the slotted cylinder (component 3) is concentric with power shaft 1 but rotates idle (freely) relative to it. Structural details of the slotted cylinder (component 3) are shown in FIG. 9A and FIG. 9B.

Figure 10A:
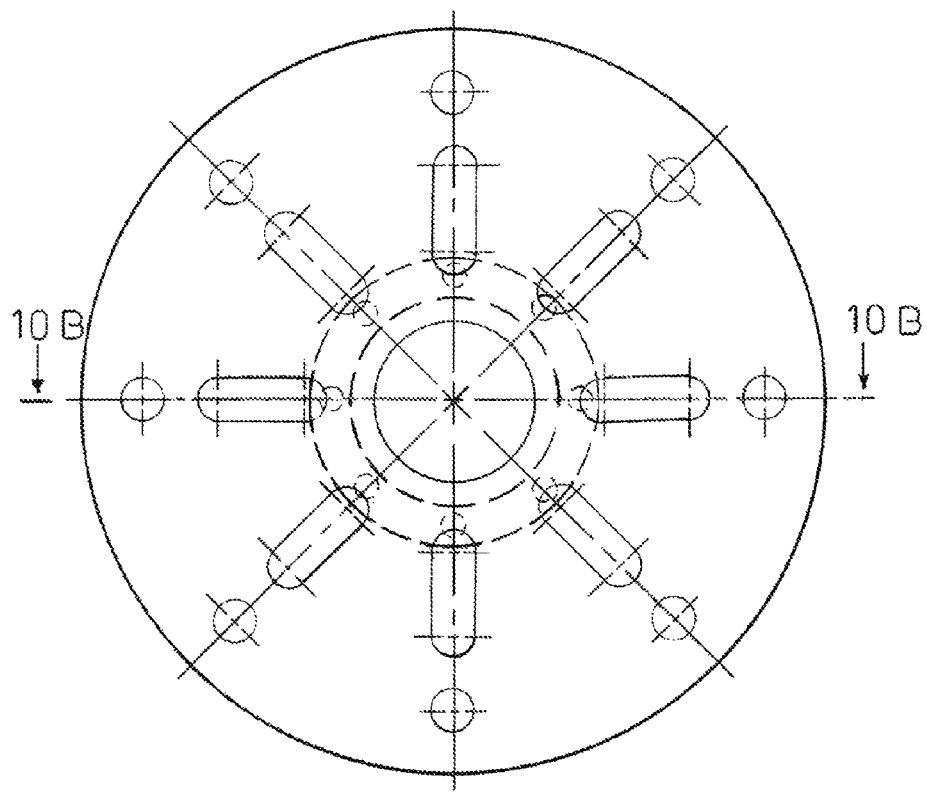
FIG. 10A and FIG. 10B are schematics of front and top views of the extended slotted cylinder (component 4) as seen in FIG. 7.
Figure 10B:
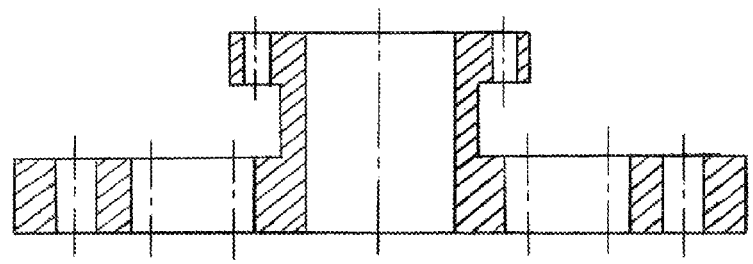

Referring to FIG. 7, the extended slotted cylinder (component 4) is concentric with power shaft 1 but rotates idle (freely) relative to it. Structural details of the extended slotted cylinder (component 4) are shown in FIG. 10A and FIG. 10B.

Figure 11A:
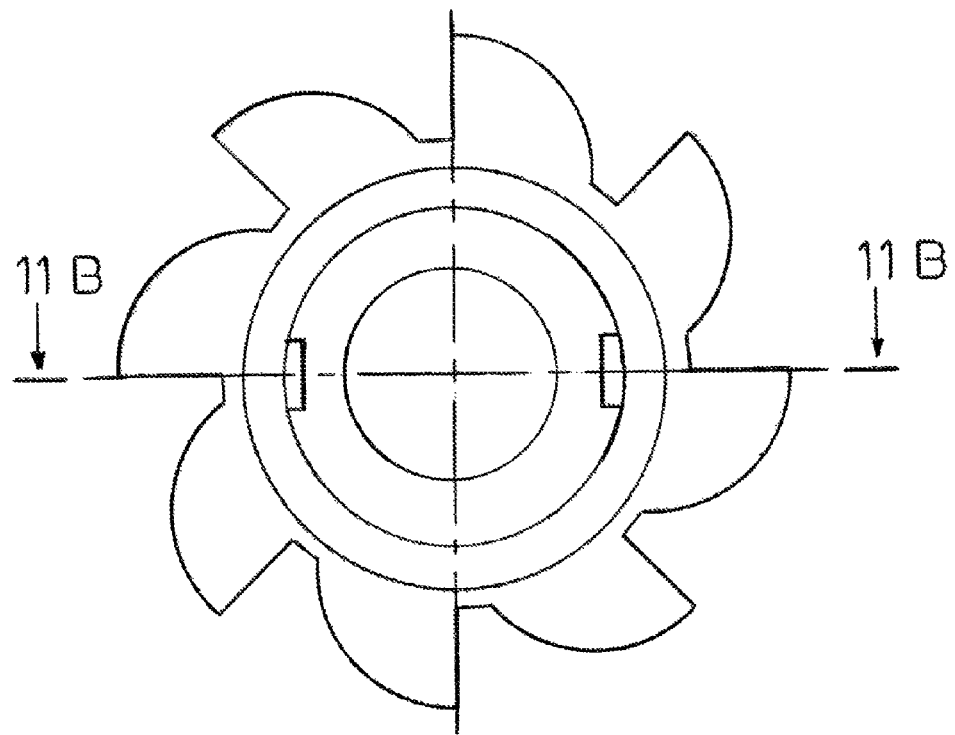
FIG. 11A and FIG. 11B are schematics of front and top views of the extended ratchet-like cylinder (component 5) as seen in FIG. 7.
Figure 11B:
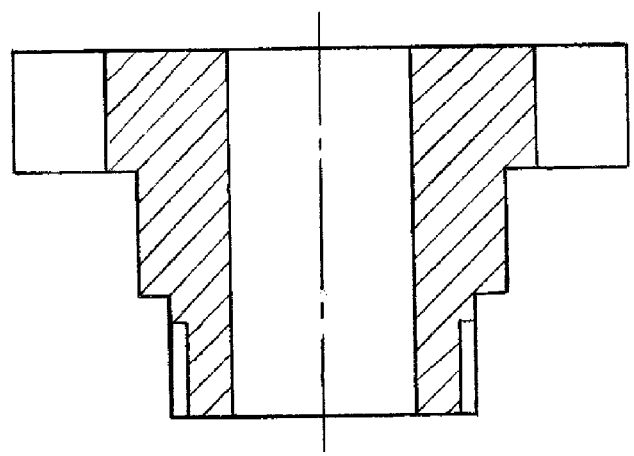

Referring to FIG. 7, the extended ratchet-like cylinder (component 5) can transmit rotation and power to power shaft 1 only in one direction (opposite direction compared to that generated by component 2). The extended ratchet-like cylinder (component 5) is concentric with the power shaft 1 but rotates idle (freely) relative to it. The extended ratchet-like cylinder (component 5) has keyways on its other end so it can transmit rotation and power to component 11, as seen in FIG. 7. Structural details of the extended ratchet-like cylinder (component 5) are shown in FIG. 11A and FIG. 11B. Two keyways are shown in FIG. 11A and FIG. 11B; any other desired number of keyways may be used to assure safe transmission of a desired power. As seen in FIG. 7, the extended ratchet-like cylinder (component 5) also has a cylindrical section at its middle so it can support component 6. Some or all surfaces of the extended ratchet-like cylinder (component 5) may be covered by plastic or rubbery pads, or any other noise absorbing material(s) to absorb noise that is due to metal-to-metal contact, as desired.

Figure 12A:
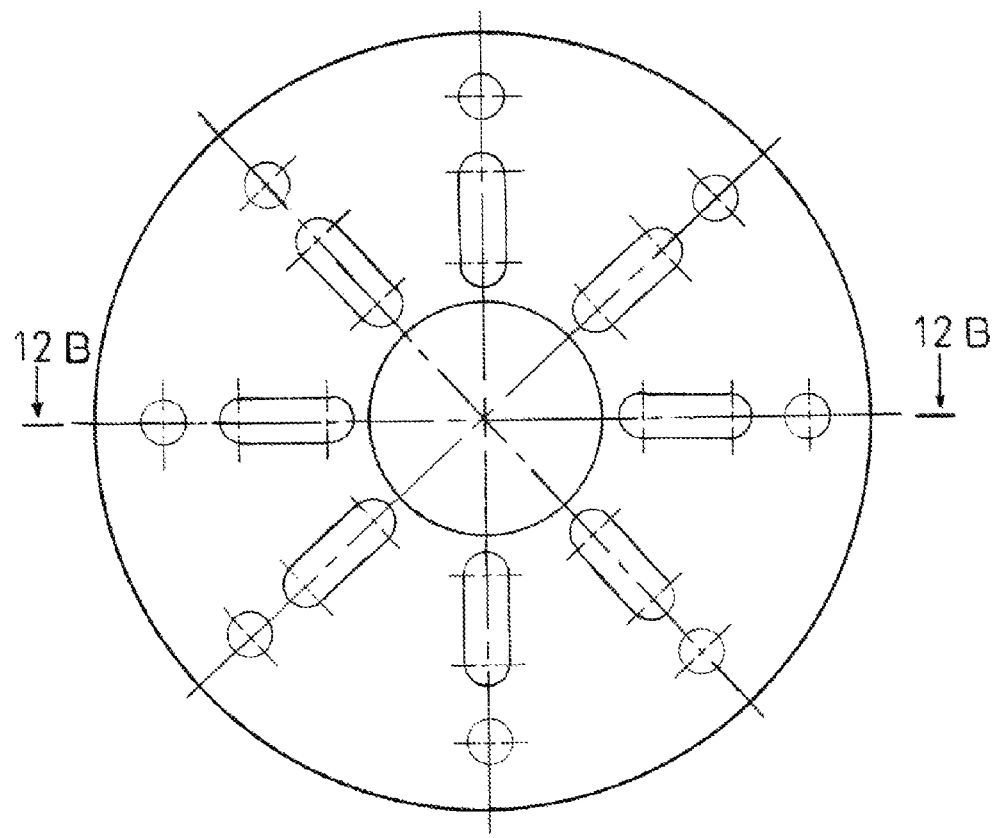
FIG. 12A and FIG. 12B are schematics of front and top views of the slotted disk (component 6) as seen in FIG. 7.
Figure 12B:
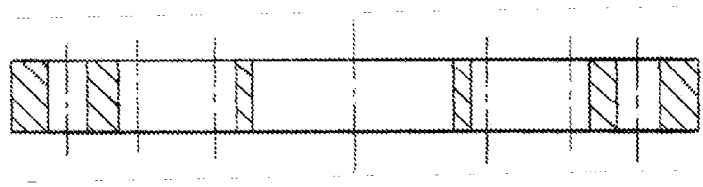

Referring to FIG. 7, slotted disk (component 6) is concentric with the extended ratchet-like cylinder (component 5). It is supported by the cylindrical section of the extended ratchet-like cylinder (component 5) but rotates idle (freely) relative to it. Structural details of the slotted disk (component 6) are shown in FIG. 12A and FIG. 12B.

Figure 13A:
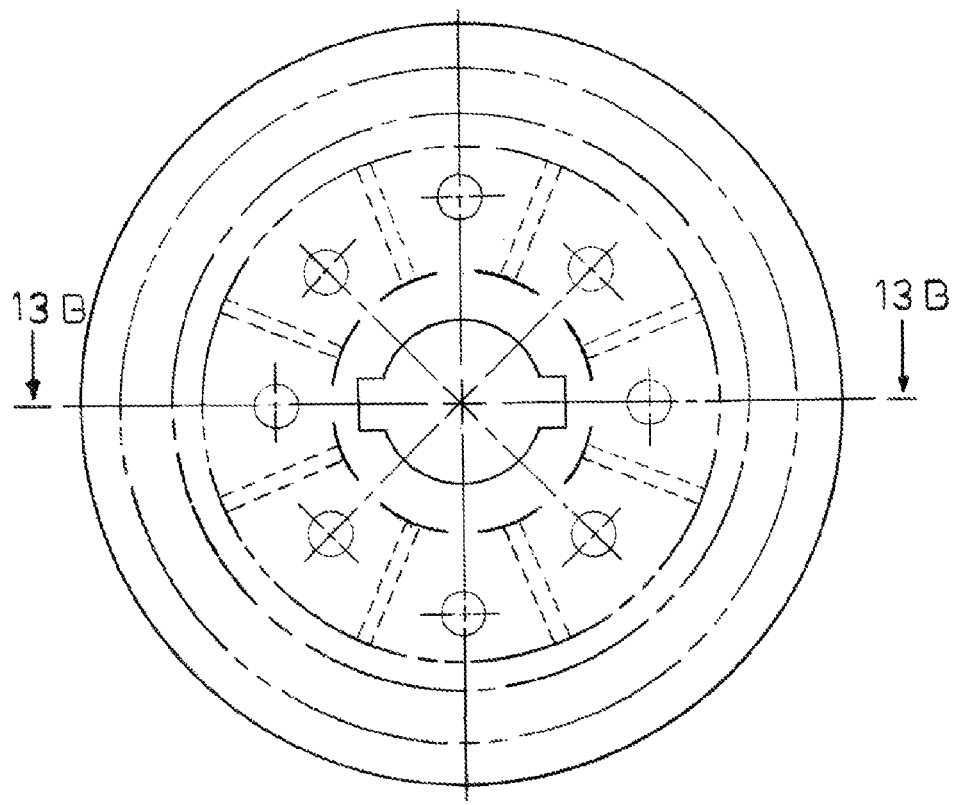
FIG. 13A and FIG. 13B are schematics of front and top views of the internally-geared cylinder (component 7) as seen in FIG. 7.
Figure 13B:
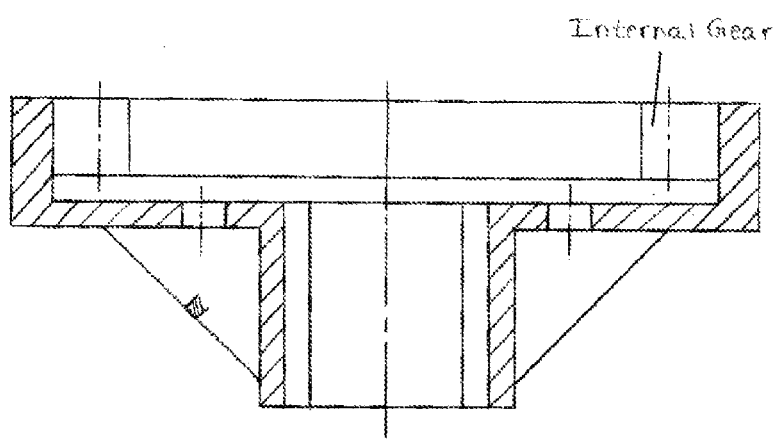

Referring to FIG. 7, the internally-geared cylinder (component 7) is concentric and engaged with the power shaft 1 by keys or any other means, such as use of splines. Structural details of the internally-geared cylinder (component 7) are shown in FIG. 13A and FIG. 13B. Two keyways are shown in FIG. 13A and FIG. 13B; any other desired number of keyways may be used to assure safe transmission of a desired power. When the internally-geared cylinder (component 7) is rotated, it transmits rotation and power to power shaft 1. The internally-geared cylinder (component 7) has an internal gear section as shown in FIG. 13A and FIG. 13B. Depicted in FIG. 13A and FIG. 13B are also eight cylindrical holes that are used to support the peripheral gear supports (components 13) that, in turn, support the peripheral gears (components 12). Depicted in FIG. 13A and FIG. 13B are also eight ribs. Any other number of holes and ribs can be used, as desired.

Figure 14A:
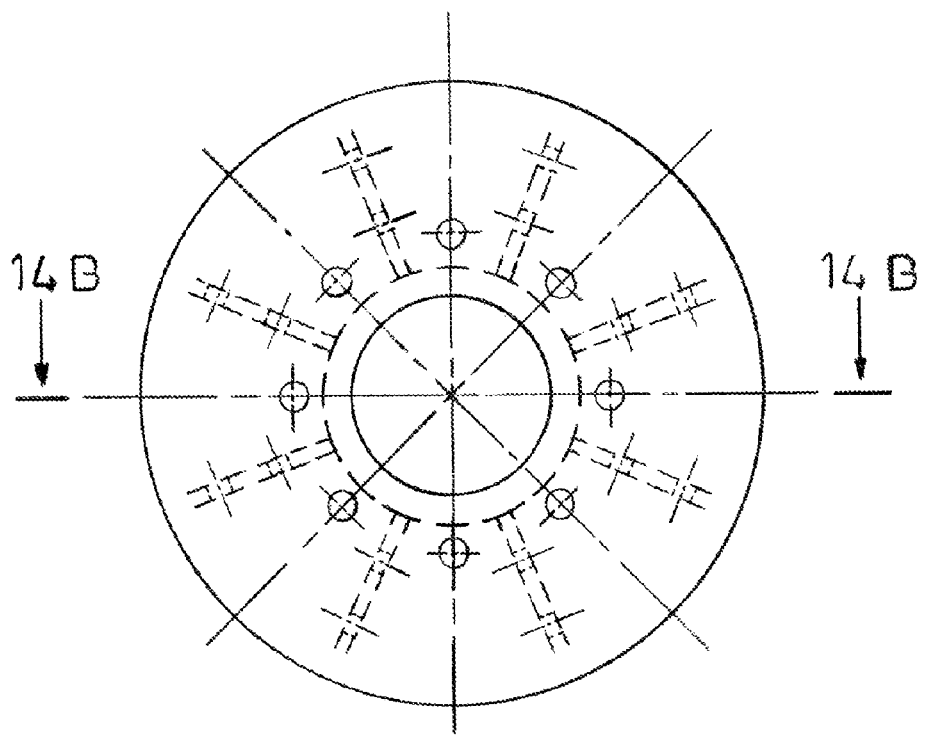
FIG. 14A and FIG. 14B are schematics of front and top views of the wheel rotor (component 8) as seen in FIG. 7.
Figure 14B:
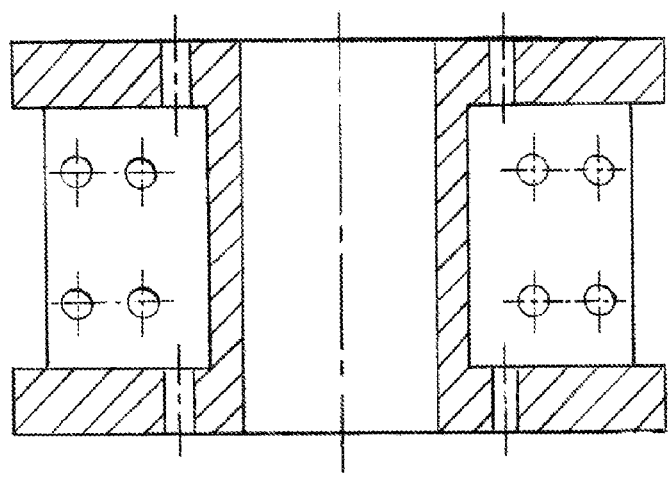

Referring to FIG. 7, wheel rotor (component 8) is concentric with power shaft 1. Wheel rotor (component 8) is supported by the power shaft 1 but rotates idle (freely) relative to it. Structural details of the wheel rotor (component 8) are shown in FIG. 14A and FIG. 14B. Depicted are eight ribs that serve as bases for attaching the wheel structure (component 9), as seen in FIG. 7. Any other number of ribs may be used, as desired. Depicted in FIG. 14A and FIG. 14B are also four holes on each rib which are used to connect wheel structure (component 9) to the wheel rotor (component 8) by the use of fasteners; any other number of holes on each rib can be used, as desired. As seen in FIG. 14A and FIG. 14B, wheel rotor (component 8) also has eight holes on each of its surfaces at each end. These holes are used to connect the two extended slotted cylinders (components 4) to the wheel rotor (component 8), as seen in FIG. 7, by the use of fasteners or other means as desired. Any other number of holes can be used on each end surface of wheel rotor (component 8), as desired. One extended slotted cylinder (component 4) will be attached to each side of the wheel rotor (component 8). When wheel rotor (component 8) is rotated, the two extended slotted cylinders (components 4) rotate with it, too.

Referring to FIG. 7, wheel structure (component 9) is a structure or frame, with desired shape and dimensions and made from desired material(s) with desired methods such as welding, use of fasteners, or combination of both. Wheel structure (component 9) is connected to the wheel rotor (component 8) by welding or use of fasteners, as desired. When wheel rotor (component 8) is rotated, wheel structure (component 9) rotates with it, too. No individual drawing of the wheel structure (component 9) is provided.

Referring to FIG. 7, paddles (components 10) can be made from any desired material(s) and can have any desired shape, geometry, and dimensions. They may be flat, semispherical, half-tube, or have any other two-dimensional or three-dimensional configuration. Paddles (components 10) may be attached to the wheel structure (component 9), with their axes at a desired angle and orientation, by welding, use of fasteners, or any other desired means. Any number of paddles (components 10) can be attached to the wheel structure (component 9) as desired. Paddles (components 10) can be fixed to the wheel structure (component 9) or they can slide on it, as desired, so they can be positioned at any distance from the axis of rotation of the wheel structure (component 9). Ropes, chains, cables, pulleys, and other desired components (not shown) can be used to move (slide) paddles (components 10) on the wheel structure (component 9), preferably moving all paddles together, as desired. Paddles (components 10) may be pulled out of flowing water by sliding them, when desired, towards the axis of rotation. This facilitates shutting down the renewable energy extraction device for repair and maintenance operations. No individual drawing of the paddles (components 10) is provided.

Referring to FIG. 7, the inner gear (component 11) is concentric with the extended ratchet-like cylinder (component 5) and is supported by it. The inner gear (component 11) is engaged with the extended ratchet-like cylinder (component 5) by keys or other means such as use of splines. Any number of keys may be used as desired. When the extended ratchet-like cylinder (component 5) is rotated, the inner gear (component 11) will rotate with it, too. No individual drawing of the inner gear (component 11) is provided.

Referring to FIG. 7, the peripheral gear (component 12) is supported by peripheral gear support (component 13) but can rotate idle (freely) relative to it. The peripheral gear (component 12) transmits rotation and power from the inner gear (component 11) to the internally-geared cylinder (component 7). Axial movement of the peripheral gear (component 12) relative to the peripheral gear support (component 13) is prevented, as desired. No individual drawing of the peripheral gear (component 12) is provided. Any number of peripheral gears (component 12) may be used as desired.

Referring to FIG. 7, the peripheral gear support (component 13) is a shaft, or a shaft that is partially threaded at one end, with desired material, shape, and dimensions. The peripheral gear support (component 13) supports the peripheral gear (component 12) and can be attached to the internally-geared cylinder (component 7) by desired means such as use of fasteners, keys, or splines, or it could rotate freely in a hole drilled in component 7. Axial movement of component 13, relative to the internally-geared cylinder (component 7), can be prevented or controlled by desired means. No individual drawing of the peripheral gear support (component 13) is provided.

Referring to FIG. 7, the synchronizer (component 14) is a shaft or stud bolt that is used to attach the extended slotted cylinder (component 4) to the slotted cylinder (component 3); it also attaches the extended slotted cylinder (component 4) to the slotted disk (component 6). Because of these attachments, the slotted cylinder (component 3) and the extended slotted cylinder (component 4) rotate together as a single object. Similarly, the synchronizer (component 14) makes the extended slotted cylinder (component 4) and the slotted disk (component 6) also rotate together as a single object. Axial movement of the synchronizer (component 14) is prevented by the use of fasteners or other means, as desired. Any number of synchronizers (component 14) can be used; a total of sixteen have been used here as it can be understood by examining FIG. 9, FIG. 10, and FIG. 12. Synchronizer (component 14) can be made from any material, with any length, and with any diameter or different diameters at different sections. No individual drawing of the synchronizer (component 14) is provided.

Referring to FIG. 7, the power transmission element (component 15) is a shaft or stud bolt that can slide on curved surfaces of the rotating ratchet-like cylinder (component 2) while moving up and down in slots of the slotted cylinder (component 3) and the extended slotted cylinder (component 4). Similarly, the power transmission element (component 15) can slide on curved surfaces of the rotating extended ratchet-like cylinder (component 5) while moving up and down in slots of the extended slotted cylinder (component 4) and the slotted disk (component 6). Axial movement of the power transmission element (component 15) is prevented or controlled by desired means. A desired number of springs (not shown in FIG. 7) can be used to keep the power transmission element (component 15) in contact with surfaces of the rotating ratchet-like cylinder (component 2) and extended ratchet-like cylinder (component 5), by desired means, at all times as the power transmission element (component 15) moves up and down in slots. Any number of power transmission elements (component 15) can be used as desired; a total of sixteen have been used here as can be understood by examining FIG. 9, FIG. 10, and FIG. 12. The power transmission element (component 15) can be made from any desired material, with any length, and with any diameter or combination of diameters. A sleeve (jacket), from plastic, rubber, or any other noise absorbing material(s), can be used around some or all surfaces of the power transmission element (component 15) to absorb noise, which is due to its contact with other components, as desired. No individual drawing of the power transmission element (component 15) is provided.

Referring to FIG. 7, all components of the rotation direction control mechanism will be made with desired materials or combination of materials and with desired size, shape, and geometry to transmit power with a desired magnitude. When necessary, axial movements of all components will be prevented or controlled by desired means.

Referring to FIG. 7, the extended ratchet-like cylinder (component 5) and the inner gear (component 11) may be combined together and built as a single component; this can be done by cutting gear teeth directly on the left end surface of the extended ratchet-like cylinder (component 5).

7. Function of the Rotation Direction Control Mechanism

Referring to FIG. 7, when the wheel (combination of wheel rotor 8, wheel structure 9, and paddle 10) rotates in clockwise direction (when viewed from the right end of the power shaft 1), the extended slotted cylinder (component 4), the slotted cylinder (component 3), and the power transmission element (component 15) rotate with it, too. Power and rotation are transmitted to the ratchet-like cylinder (component 2) by the power transmission element (component 15) and eventually to the power shaft 1 since the ratchet-like cylinder (component 2) is keyed to the power shaft 1. Thus, the power shaft 1 rotates in clockwise direction (when viewed from the right end of the power shaft 1), too. Under these conditions, those power transmission elements (components 15) that are in contact with the extended ratchet-like cylinder (component 5), slide on curved surfaces of the extended ratchet-like cylinder (component 5) without any transmission of power to it. Therefore, for clockwise rotation of the wheel, rotation and power are transmitted to the power shaft 1 only by the ratchet-like cylinder (component 2) and in the clockwise direction.

Referring to FIG. 7, when the wheel (combination of wheel rotor 8, wheel structure 9, and paddle 10) rotates in counterclockwise direction (when viewed from the right end of the power shaft 1), the extended slotted cylinder (component 4), the slotted disk (component 6), and the power transmission element (component 15) rotate with it, transmitting power and rotation in the counterclockwise direction to the extended ratchet-like cylinder (component 5) and the inner gear (component 11), which is keyed to the extended ratchet-like cylinder (component 5). This, in turn, results in transmission of power and rotation in the clockwise direction to the peripheral gear (component 12) and the internally-geared cylinder (component 7) through its internal-gear section. The internally-geared cylinder (component 7), which is keyed to power shaft 1, transmits power and rotation in the clockwise direction to power shaft 1. Under these conditions, those power transmission elements (components 15) that are in contact with the ratchet-like cylinder (component 2) slide on curved surfaces of the ratchet-like cylinder (component 2) without any transmission of power to it. Therefore, for counterclockwise rotation of the wheel, rotation and power are transmitted to the power shaft 1 only by the extended ratchet-like cylinder (component 5) and in the clockwise direction.

Referring to FIG. 7, power shaft 1 will always rotate in clockwise direction (when viewed from the right end of the power shaft 1) independent of direction of rotation of the wheel, thus independent of the direction of flow of water through the high-speed flow compartment of the renewable energy extraction device. It should be noted that the single direction of rotation of the power shaft 1, weather clockwise or counterclockwise, depends on direction of the curved surfaces of the ratchet-like cylinder (component 2) and the extended ratchet-like cylinder (component 5).

8. Embodiment Floating and Partially Submerged in Water

Figure 15:
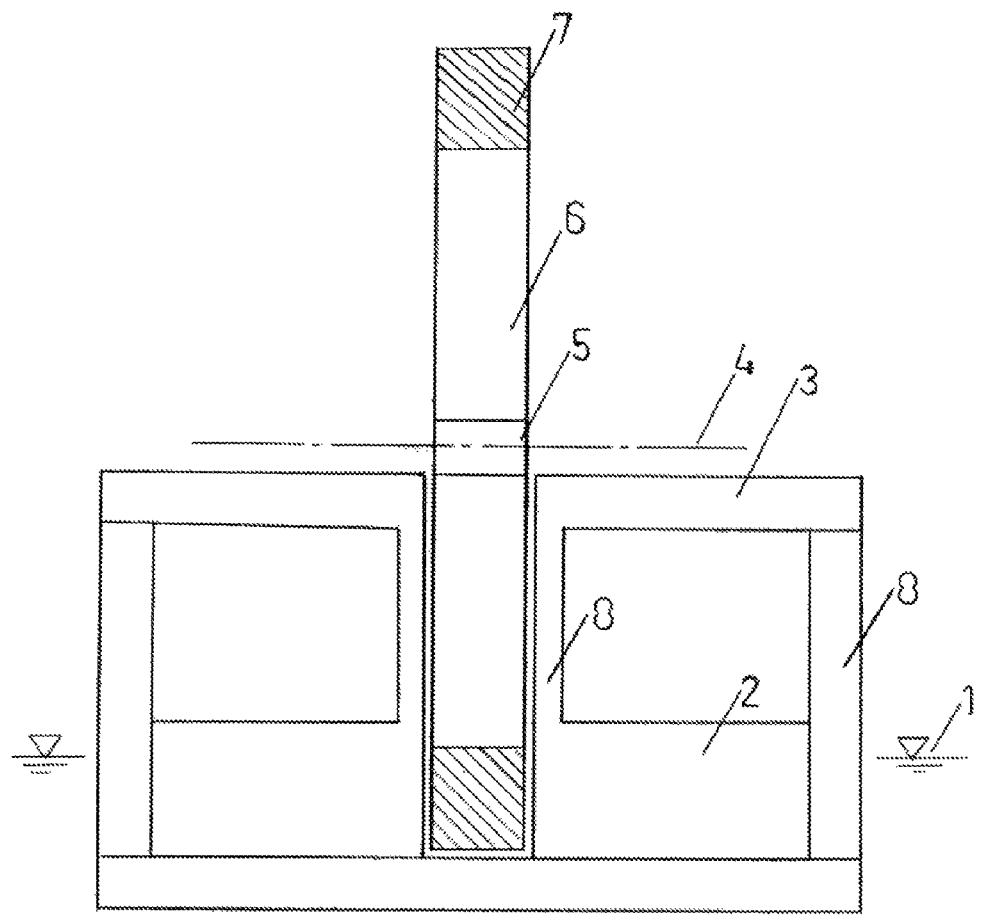
FIG. 15 is schematic of simplified renewable energy extraction device representing a small unit floating and partially submerged in a river or a large unit either floating like a barge-like structure or built into the ground in sea or ocean.

FIG. 15 shows a simplified schematic of the renewable energy extraction device (not all components are shown) that can represent a unit floating and partially submerged in a river. It can also represent a large unit, to be used in sea or ocean, either floating and partially submerged in water similar to a barge-like structure, or built into the ground. Desired attachment(s) will be used to anchor a floating renewable energy extraction device in a desired location while allowing it to move up and down as water level changes.

Referring to FIG. 15, lower platform 2 (including inlet, high-speed flow, and exit compartments) is partially submerged in water to a desired height. The lower platform 2 may be built from metals, non-metal materials, concrete, or a combination of different materials. All instrumentation, stationary and rotary equipment (not shown), with axis of rotation 4, may be mounted on the upper platform 3 which is maintained above water level 1. The upper platform 3 may be built from metals, non-metal materials, concrete, or a combination of different materials.

Referring to FIG. 15, for river application, wheel rotor 5 is engaged with the power shaft (not shown) by keys or other desired means such as splines, so that wheel rotor and the power shaft rotate together. For ocean application, where direction of velocity of the flowing water is changed with time, wheel rotor 5 is idle (rotates freely) relative to the power shaft, but it transmits power and rotation to the power shaft through the rotation direction control mechanism (not shown).

Referring to FIG. 15, wheel structure 6 is a structure with desired size, shape, geometry, and is made from desired material(s). Wheel structure 6 is attached to the wheel rotor 5 by welding, use of fasteners, or other means as desired. Paddles 7 can have any desired size and two-dimensional or three-dimensional shape and geometry; they could be attached to the wheel structure 6 by fasteners, at desired locations, with the possibility to alter their location as desired. Ropes, pulleys, chains, and cables (not shown) may be used to alter location of the paddles on the wheel structure 6. Structure 8 is a desired structure made from metals, non-metal materials, concrete, or a combination of different materials that connects the upper and lower platforms together.

9. Air Embodiment

Figure 16:
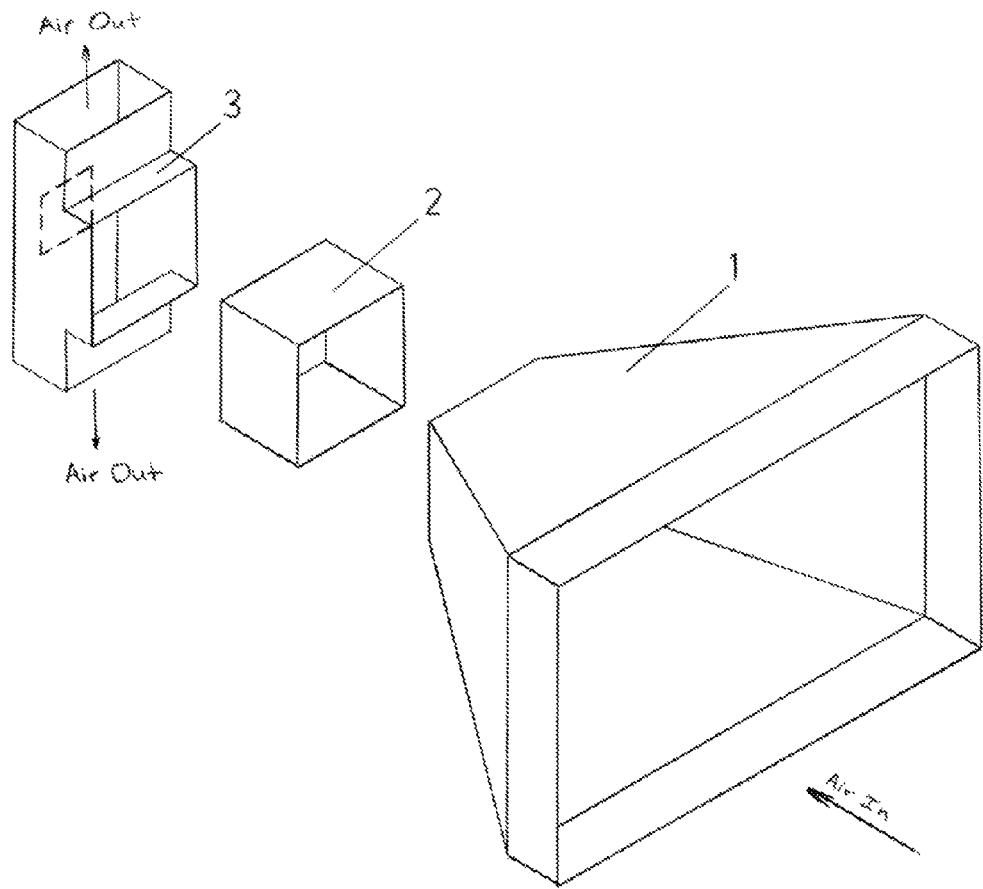
FIG. 16 is schematic of the simplified renewable energy extraction device (not all components not shown here) that can be used to extract energy from flowing air either onshore or offshore.

FIG. 16 shows simplified schematic of the inlet, high-speed flow, and exit compartments of a renewable energy extraction device (not all components are shown) that can be used for air application either onshore or offshore.

Referring to FIG. 16, air flow velocity is increased as cross sectional area of the inlet compartment 1 is reduced in the flow direction. Inlet compartment 1 can have any desired size and shape and its cross sectional area can be reduced with any desired pattern; it can be made from any material or combination of materials. Inlet compartment 1 can include a structure or frame, rigid or foldable, with rigid or foldable sheet(s) from any material(s) attached (or secured) to the structure or frame by desired means. The use of a foldable structure or frame with foldable sheet(s) in making the inlet compartment 1 allows carrying the renewable energy extraction device in a compact form easily and set it in a desired location in a short time. Except at its inlet and outlet, the inlet compartment 1 for air application has a closed contour. Equivalently, the inlet compartment 1 can also be made as a single rigid component from any material, if desired.

Referring to FIG. 16, a screening device (not shown), such as screen(s) with desired mesh size(s), can be attached to the inlet compartment 1 at a desired location by welding, use of fasteners, or any other desired means to prevent birds, debris or any other undesired particles and objects from entering the renewable energy extraction device.

Referring to FIG. 16, air velocity reaches a maximum magnitude as it exits the inlet compartment 1. High-speed air is then directed into the high-speed flow compartment 2, where its energy is transmitted to a rotary energy extraction component (not shown) that is engaged with a power shaft (not shown) by welding, keys, or other means such as splines as desired. The high-speed flow compartment 2 can be made from any material or combination of materials. It can include a structure or frame, rigid or foldable, with rigid or foldable sheet(s) from any material(s) attached (or secured) to the structure or frame by any desired means. The use of a foldable structure or frame with foldable sheet(s) in making the high-speed flow compartment 2 allows carrying the renewable energy extraction device in a compact form easily and set it in a desired location in a short time. Equivalently, the high-speed flow compartment 2 can also be made as a single rigid component from any material, if desired. Except at its inlet and outlet, the high-speed flow compartment 2 for air application has a closed contour and can have any desired shape, geometry, and dimensions.

Referring to FIG. 16, the power shaft (not shown) is housed within the high-speed flow compartment 2 and is supported by any desired number of bearings, which that can be rolling-contact bearings, sleeve bearings, or a combination of both. Bearings (not shown) may be attached to the high-speed flow compartment 2 and the exit compartment 3 by welding, fasteners, or any other means, as desired.

Referring to FIG. 16, exit compartment 3 directs air to atmosphere after its energy is transmitted to the power shaft (not shown). Exit compartment 3 can have any desired shape and geometry with any desired dimensions and it may release air in the vertical direction (upward and downward), horizontal direction (right and left), or any other direction as desired. The exit compartment 3 can be made from any material or combination of materials. It can include a structure or frame, rigid or foldable, with rigid or foldable sheet(s) from any material(s) attached (or secured) to the structure or frame by fasteners or other means, as desired. The use of a foldable structure or frame with foldable sheet(s) in making the exit compartment 3 allows carrying the renewable energy extraction device in a compact form easily and set it in a desired location in a short time. Equivalently, the exit compartment 3 can also be made as a single rigid component from any material, if desired. As seen in FIG. 16, the exit compartment 3 has an opening on its back side (surface) which allows the power shaft (not shown) that is housed within the high-speed flow compartment 2, to be connected to other components such as transmission system (not shown) or electric generator (not shown) by couplings (not shown), spacer shafts (not shown), universal joints (not shown), or other means, as desired.

Referring to FIG. 16, screening device(s) (not shown), such as screen(s) with desired mesh size(s), can be attached to the exit compartment 3 at desired location(s) by welding, use of fasteners, or other means, as desired, to prevent birds, debris or any other undesired particles and objects from entering the renewable energy extraction device.

Referring to FIG. 16, any of the inlet, high-speed flow, and exit compartments of the renewable energy extraction device may be built as a single piece or assembly of multiple pieces for ease of manufacturing, installation, and transportation. Each compartment may be built from any material(s) or combination of materials with any size, shape, and geometry. Each compartment will have attachments, as desired, so the compartments can be attached together or to a structure, by welding, use of fasteners, or other means, as desired.

FIG. 17 shows assembly of two identical units of renewable energy extraction devices for air application that share the same rotary and stationary structures. The two units are mounted on the rotary structure back-to-back, on the same radial axis and on the same side relative to the axis of rotation of the rotary structure. Components only on the right unit have been labeled. Identified components may be arranged in any other order, relative to each other, if desired.

Referring to FIG. 17, the use of two units of renewable energy extraction devices on the rotary structure, back-to-back, is to assure that flowing air (wind) will enter the inlet compartment of one of the two units for any wind direction, when the common radial axis of the two units is parallel with the wind direction. Referring to FIG. 17, if wind direction is from left to right, the left unit will capture air and extract its energy. Similarly, if wind direction is from right to left, the right unit will capture air and extract its energy. Wind forces acting on external surfaces of different compartments and components of the two units make the rotary structure, on which all compartments and components are mounted, rotate. The rotary structure stops rotating when the common radial axis of the two units becomes parallel with the wind direction.

Referring to FIG. 17, the indicated electric generators of the two units can be connected to a power grid (not shown) by any desired means. The two units on the rotary structure may also share a single electric generator, if desired, with details depicted in FIG. 18.

Referring to FIG. 17, instead of electric generator(s), the captured energy from wind can be used to drive pump(s), compressor(s), or any other rotary equipment, as desired.

Referring to FIG. 17, the renewable energy extraction device for air application may be used onshore or offshore, as desired. For offshore application, the stationary structure 1 may be a stationary offshore structure, or it may be any floating or partially submerged structure (such as a barge-like structure) that is anchored by desired means in a desired location. Similarly, multiple pairs of renewable energy extraction devices and their associated rotary structures may be mounted on a single large stationary structure or floating structure (barge-like structure). All necessary instrumentation and equipment (not shown) will be added to assure safe operation of the group of renewable energy extraction devices and transmission of the produced electrical power to a power grid. Also, any number of renewable energy extraction devices for different applications, such as devices for ocean application and air application, may be mounted on a single large stationary structure or a floating structure (barge-like structure) with all necessary instrumentation and equipment to transmit the power, that is produced by all renewable energy extraction devices, to a power grid.

Referring to FIG. 17, stationary structure 1 is a desired structure, rigid or foldable, made from any material or combination of materials, with desired dimension, shape, and configuration. For both onshore and offshore applications, the stationary structure 1 may be mounted on a foundation (not shown), as desired. The stationary structure 1 may also have attachments (not shown) so that cables, ropes, chains, wires, metal or non-metal strings, or any other similar component can be used to further secure the stationary structure 1 to its foundation or to the ground, as desired. The use of foldable structure(s) in making the stationary structure 1 allows carrying the renewable energy extraction device in a compact form easily and set it in a desired location in a short time. For a large scale renewable energy extraction device for air application, the top surface of the stationary structure 1 also provides work area for crew, as desired. For offshore application, the stationary structure 1 may also be any floating structure (such as a barge-like structure) that can be anchored in a desired location. The floating structure, while being anchored in a desired location, has necessary attachment(s) (not shown) and necessary means allowing it to move up and down as water level rises or recedes.

Referring to FIG. 17, rotary structure 2 is a structure, rigid or foldable, made from any material or combination of materials, with desired shape, dimension, and configuration. The use of foldable structure(s) in making the rotary structure 2 allows carrying the renewable energy extraction device in a compact form easily and set it in a desired location in a short time. All or some of the compartments and components of the two identical renewable energy extraction devices and their required instrumentation could be mounted on the rotary structure 2, as desired. For a large scale renewable energy extraction device for air application, the top surface of the rotary structure 2 also provides work area for crew, as desired.

Referring to FIG. 17, the rotary structure 2 is mounted on the stationary structure 1 and can rotate relative to it. Wind forces, which are exerted on side surfaces of the rotary structure 2 and all compartments and components of the two identical units, make the rotary structure 2 rotate on the stationary structure 1 until the common radial axis of the two identical units becomes parallel with the wind direction. Rigid or foldable sheets from any desired material and with any desired shape and size may be attached to the rotary structure 2 by fasteners or other desired means, to produce sufficient wind force which is required to rotate the rotary structure 2.

Referring to FIG. 17, attachment(s) (not shown) may be used on both rotary and stationary structures so the rotary structure can be anchored to the stationary structure 1 or any other desired structure (not shown) at a desired angle (when viewed from above), if desired. Anchoring the rotary structure 2 keeps it at a desired angle (when viewed from above) and prevents it from rotation; this feature is useful in keeping the rotary structure 2 in a desired direction, such as the wind direction, manually and is also useful during shutting down period for repair and maintenance operations.

Referring to FIG. 17, wheels 3 may be attached to the rotary structure 2 allowing it to rotate on the stationary structure 1 easily. Three wheels 3 are shown in FIG. 17; any other number of wheels can be used as desired. All or some of the wheels 3 may be equipped with electric motors (not shown) and their associated power sources (not shown) and necessary instrumentation (not shown) so that the rotation of the rotary structure 2 on the stationary structure 1 can be controlled, as desired, independent of the magnitude of the wind force acting on side surfaces of compartments and components of the two renewable energy extraction device units. Equivalently, instead of using wheels 3, rotation of the rotary structure 2 on the stationary structure 1 may be accommodated by the use of any type of rollers that may be attached to any of the rotary or stationary structures, or by providing a means of lubricating flat surfaces of the two stationary and rotary structures that are in sliding contact with each other.

Referring to FIG. 17, inlet compartment 4 is as described in FIG. 16.

Referring to FIG. 17, high-speed flow compartment 5 is as described in FIG. 16.

Referring to FIG. 17, energy extraction component 6 is a single-stage or multistage axial-flow air or wind turbine that is housed within the high-speed flow compartment 5. Its shaft is supported by any desired number of bearings (rolling-contact bearings, sleeve bearings, or a combination of both) that may be attached to the high-speed flow compartment 5 and exit compartment 7 by welding, use of fasteners, or other means, as desired. Shaft of the axial-flow air or wind turbine is projected out through an opening in the back side of the exit compartment 7 so it can be connected to other rotary components of the renewable energy extraction device for transmission of extracted power.

Referring to FIG. 17, exit compartment 7 is as described in FIG. 16.

Referring to FIG. 17, coupling 8 is used to transfer power from one rotating shaft to another, as desired.

Referring to FIG. 17, flywheel 9, with desired type, size, and capacity is used to store the captured energy and minimize fluctuation in the rotational speed of the power shaft and other rotary components, as desired.

Referring to FIG. 17, flywheel shaft 10 is supported by any number of bearings (rolling-contact bearings, sleeve bearings, or a combination of both) that are attached to the rotary structure 2 by welding, use of fasteners, or other means, as desired.

Referring to FIG. 17, transmission system 11 is used to alter rotational speed of shafts, which are coupled to each other, as desired.

Referring to FIG. 17, spacer shaft 12 is a shaft with desired shape, dimensions, and configuration that connects the transmission system 11 to the shaft of the electric generator 13. Spacer shaft 12 is used to accommodate assembling or disassembling of transmission system 11 or the electric generator 13.

Referring to FIG. 17, electric generator 13, with desired rating, is used to convert the mechanical energy of the power shaft to electrical power which is transmittable to a power grid, as desired. Equivalently, the mechanical energy of the power shaft may be transmitted to pump(s), compressor(s), or any other rotary equipment (not shown), as desired.

Referring to FIG. 17, the rotary structure 2 can rotate on the stationary structure 1 about the axis of rotation 14.

Referring to FIG. 17, flow restriction device 15 is any desired type of valves, or gate, and is normally open to allow flow of air through the renewable energy extraction device. The flow restriction device 15 will be closed, thus preventing air from entering the high-speed flow compartment 5, to prepare the renewable energy extraction device unit for shutting down for repair and maintenance operations. The flow restriction device 15 can be manually or power driven type, as desired.

Referring to FIG. 17, the screening device 16 utilizes screen(s) with desired mesh size(s) to prevent birds, debris or any other undesired particles and objects from entering the renewable energy extraction device. The screening device 16 is attached to the inlet compartment 4, at a desired location, by welding, use of fasteners, hinges, or other means, as desired.

Figure 18:
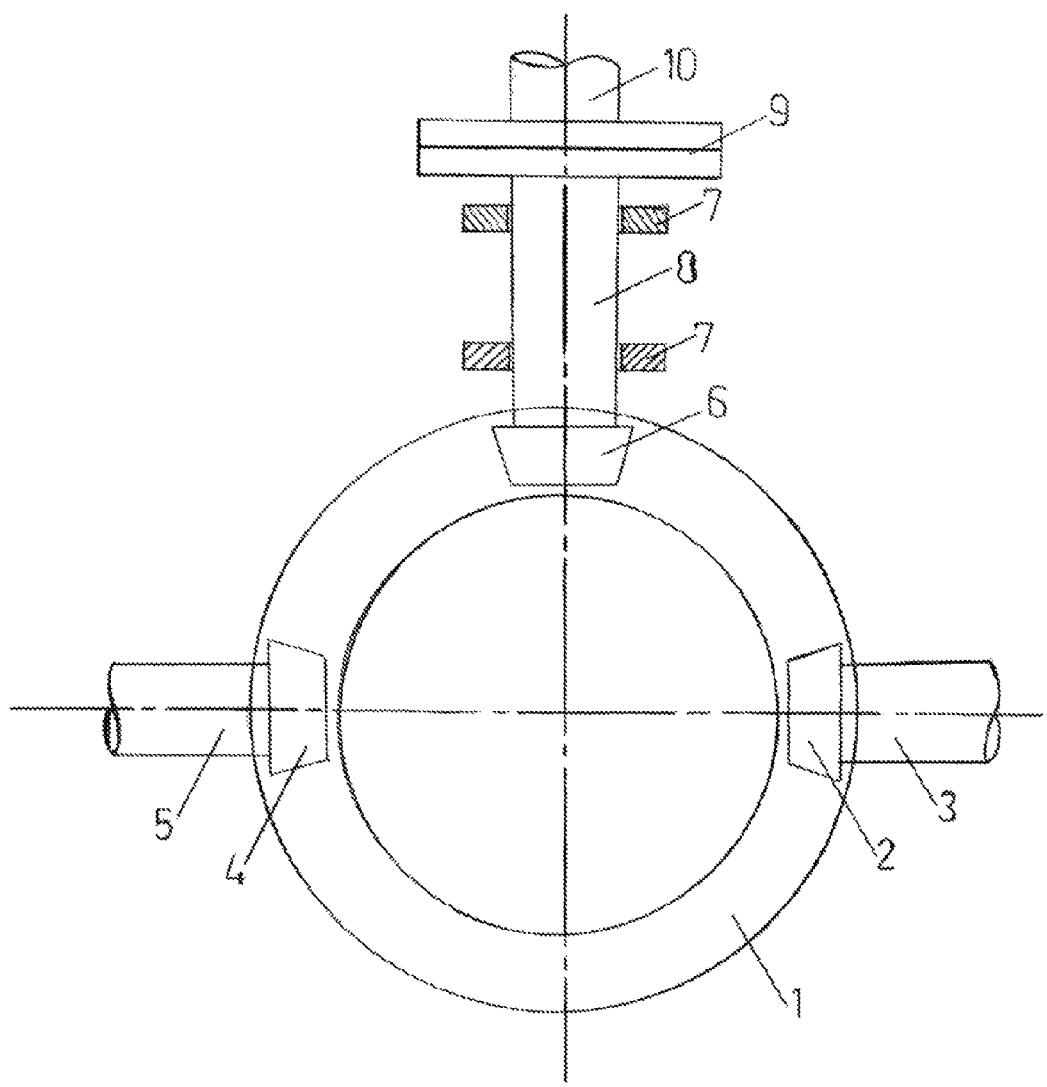
FIG. 18 is schematic of the top view of a simplified electric generator sharing mechanism used to allow a pair of renewable energy extraction devices for air applications, which are mounted on a rotary structure, share a single electric generator.

FIG. 18 shows schematic of the top view of a simplified electric generator sharing mechanism that can be used to allow a pair of identical renewable energy extraction devices for air application, which are mounted on the same rotary structure, share a single electric generator. When the common axes of the two renewable energy extraction devices is parallel with the wind direction, only the unit with its inlet compartment facing the wind can capture air and produce mechanical energy. Independent of which of the two devices produces mechanical energy, power shafts of both devices make the shaft of the electric generator rotate in the same direction.

Referring to FIG. 18, central gear 1 receives mechanical power, which may be delivered by any of the two identical units, and transmits it to spacer shaft 8.

Referring to FIG. 18, gear 2 is engaged with power shaft 3 by desired means such as the use of keys or splines. Power shaft 3 transmits mechanical power that is produced by the right-side unit on the rotary structure, as seen in FIG. 17, to the central gear 1. Gear 2 is engaged with the central gear 1.

Referring to FIG. 18, gear 4 is engaged with power shaft 5 by desired means such as the use of keys or splines. Power shaft 5 transmits mechanical power that is produced by the left-side unit on the rotary structure, as seen in FIG. 17, to the central gear 1. Gear 4 is engaged with the central gear 1.

Referring to FIG. 18, gear 6 is engaged with spacer shaft 8 by desired means such as the use of keys or splines.

Referring to FIG. 18, spacer shaft 8 is supported by bearings 7, which might be rolling-contact bearings, sleeve bearings, or a combination of both. Bearings 7 may be attached to the rotary structure (not shown) of the renewable energy extraction device by welding, use of fasteners, or other means as desired. Two bearings 7 are shown; any other number of bearings 7 may be used as desired.

Referring to FIG. 18, coupling 9 connects spacer shaft 8 to shaft 10, which is the shaft of the single electric generator (electric generator is not shown) that is shared by both renewable energy extraction devices.

Referring to FIG. 18, all gears are preferably bevel gears. Axial movements of all shafts are prevented or controlled by desired means.

Figure 19:
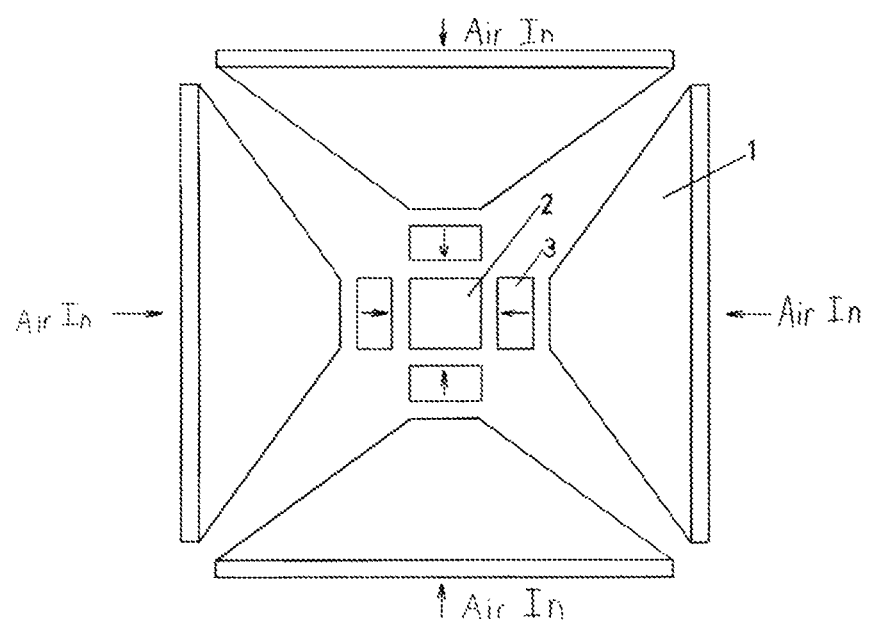
FIG. 19 is schematic of the top view of the renewable energy extraction device for wind application that does not utilize a rotary structure.

FIG. 19 shows schematic of the top view of multiple inlet compartments that can be used in a renewable energy extraction device for air application which does not need any rotary structure. Instead of having two units of renewable energy extraction devices mounted on a rotary structure, that can align itself with the wind direction, four stationary inlet compartments (each equiped with a check valve) can be used with a single central collecting duct to capture flowing air from all directions with no need to a rotary structure.

Referring to FIG. 19, inlet compartment 1 is as described in FIG. 16. Four inlet compartments 1 (each could face towards one of the north, south, east, or west directions) are mounted on a stationary structure (not shown), as desired. Openings of the adjacent inlet compartments are in close contact with each other, so almost all of the approaching air will enter one or more of inlet compartments for any wind direction. Therefore, four stationary inlet compartments on a stationary structure will be equivalent to two back-to-back inlet compartments on a rotary structure in capturing flowing air from all possible directions. Four inlet compartments 1 are shown in FIG. 19; any other number of inlet compartments may be used, as desired.

Referring to FIG. 19, central collecting duct 2 receives air from any of the four inlet compartments and directs it to the high-speed flow compartment (not shown) of the renewable energy extraction device, as desired. The central collecting duct 2 will be connected to the high-speed flow compartment (not shown) by welding, use of fasteners, or other means, as desired. The central collecting duct 2 can be made from any material or combination of materials. It can include a structure or frame, rigid or foldable, with rigid or foldable sheet(s) from any material(s) attached (or secured) to the structure or frame as desired. The use of a foldable structure or frame with foldable sheet(s) in making the central collecting duct 2 allows carrying the renewable energy extraction device in a compact form easily and set it in a desired location in a short time.

Referring to FIG. 19, each inlet compartment is equipped with a check valve (directional valve) 3 to assure that air moves only from each inlet compartment to the central collecting duct 2, but not in the opposite direction. Four check valves 3, associated with the four inlet compartments 1, are shown in FIG. 19. Independent of the number of inlet compartments that may be used, each inlet compartment will have its own associated check valve.

10. River Water Embodiment

Figure 20:
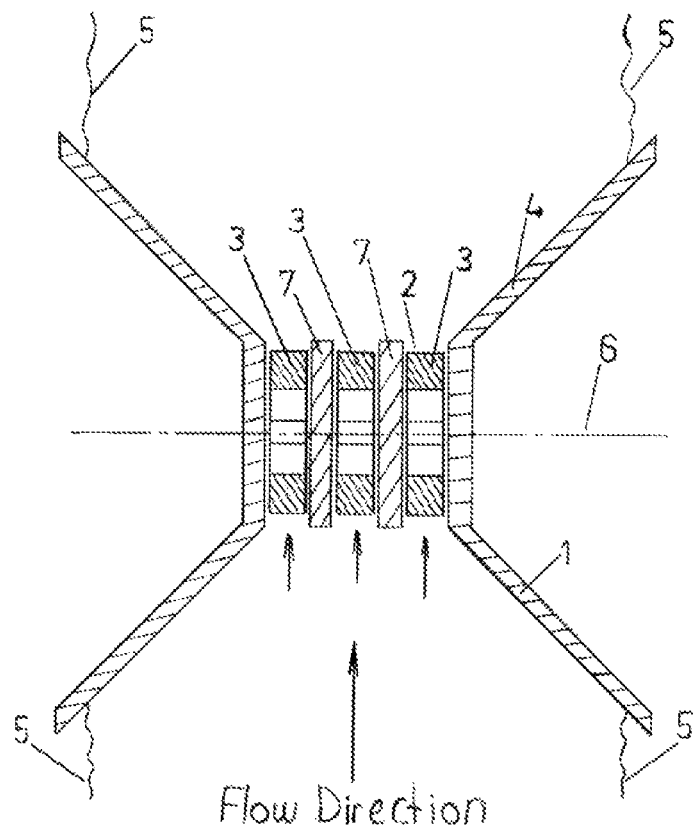
FIG. 20 is schematic of the top view of a simple renewable energy extraction device (not all components are shown) depicting multiple high-speed flow compartments with multiple energy extraction components (paddle wheels or water turbines) used with a single inlet and exit compartments.

FIG. 20 shows top view of a simple renewable energy extraction device (not all components are shown) that can be used for a large river, utilizing multiple high-speed flow compartments with multiple energy extraction components (paddle wheels or water turbines) with a single large inlet and exit compartments. Rivers with large flow rates carry a large amount of extractable energy and may require more than one energy extraction component (paddle wheel or water turbine) with realistic size. Therefore, instead of using multiple renewable energy extraction devices on span of a large river, one renewable energy extraction device with single inlet and exit compartments but with multiple high-speed flow compartments and multiple energy extraction components (paddle wheels or water turbines) may be used to extract water energy in large rivers. Each of the single inlet and exit compartments are wide enough to cover the entire river span, as desired.

Referring to FIG. 20, three high-speed flow compartments 2, with a single energy extraction component 3 (paddle wheel or water turbine) in each one, are used with one inlet compartment 1 and one exit compartment 4. Any other number of high-speed flow compartments, with any other number of energy extraction components (paddle wheels or water turbies) in each, may be used as desired. Each of the inlet compartment 1 and exit compartment 4 are wide enough to cover the entire span of the river with coastline 5.

Referring to FIG. 20, each energy extraction component 3 (paddle wheel or water turbine) is engaged with its power shaft (not shown) by the use of keys or splines (not shown) and rotates about the axis of rotation 6. When each energy extraction component 3 (paddle wheel or water turbine) rotates, its power shaft rotates with it, too.

Referring to FIG. 20, all energy extraction components 3 (paddle wheels or water turbines) may be supported by a single power shaft (not shown). Equivalently, each energy extraction component 3 (paddle wheel or water turbine) may have its own power shaft; with all power shafts connected to each other by couplings, spacer shafts, or other means (not shown), as desired. Spacer shafts (not shown) with couplings on their both ends may be used to connect any two adjacent power shafts; this simplifies assembling and disassembling each individual power shaft as well as repair and maintenance operations.

Referring to FIG. 20, height of walls of inlet, high-speed flow, and exit compartments may be constant or may vary with any desired pattern. The walls may be straight or curved (or combination of both) and may make any desired angle with respect to a horizontal surface. Slope of the bottom surfaces of the inlet, high-speed flow, and exit compartments may be the same as the natural slope of the river bed or at any other desired slope. Any of inlet, high-speed flow, and exit compartments may be built as a single piece or assembly of multiple pieces for ease of transportation and installation. The inlet, high-speed flow, and exit compartments may be built from metals, non-metal materials, concrete, or combination of them, as desired.

Referring to FIG. 20, wall (or partition) 7 is used to separate adjacent high-speed flow compartments 2. Two walls (or partitions) 7 are used to separate three high-speed flow compartments. Wall (or partition) 7 may be built with any desired size, shape, and geometry and from metals, non-metal materials, concrete, or combination of them, as desired. Some portions of the upper ends of walls (partitions) 7 may be connected to each other for increased structural strength, as desired.

Referring to FIG. 20, at least one small side canal or water way (not shown) can be built on each side of the renewable energy extraction device, along the river, to allow fish move freely from one side of the device to the other side, along the river, without being trapped on either side of the renewable energy extraction device.

Referring to FIG. 20, screening devices (not shown), such as screen(s) with desired mesh size(s), can be used with inlet compartment 1 and exit compartment 4, at desired locations, to prevent debris or any other undesired particles and objects from entering the renewable energy extraction device.

Referring to FIG. 20, all other components and equipment of the renewable energy extraction device, as seen in FIG. 3 and FIG. 4, will be incorporated to accommodate safe transmission of extracted power to the electric generator or any other rotary equipment, as desired.

Referring to FIG. 20, the inlet compartment 1 is further described as in FIG. 1, FIG. 3, and FIG. 4.

Referring to FIG. 20, the high-speed flow compartment 2 is further described as in FIG. 1, FIG. 3, and FIG. 4.

Referring to FIG. 20, the exit compartment 4 is further described as in FIG. 1, FIG. 3, and FIG. 4.

Referring to FIG. 20, energy extraction component 3 (which includes wheel rotor, wheel structure, and paddle) is further described as in FIG. 1, FIG. 3, FIG. 4, FIG. 5, and FIG. 6.

Figure 21:
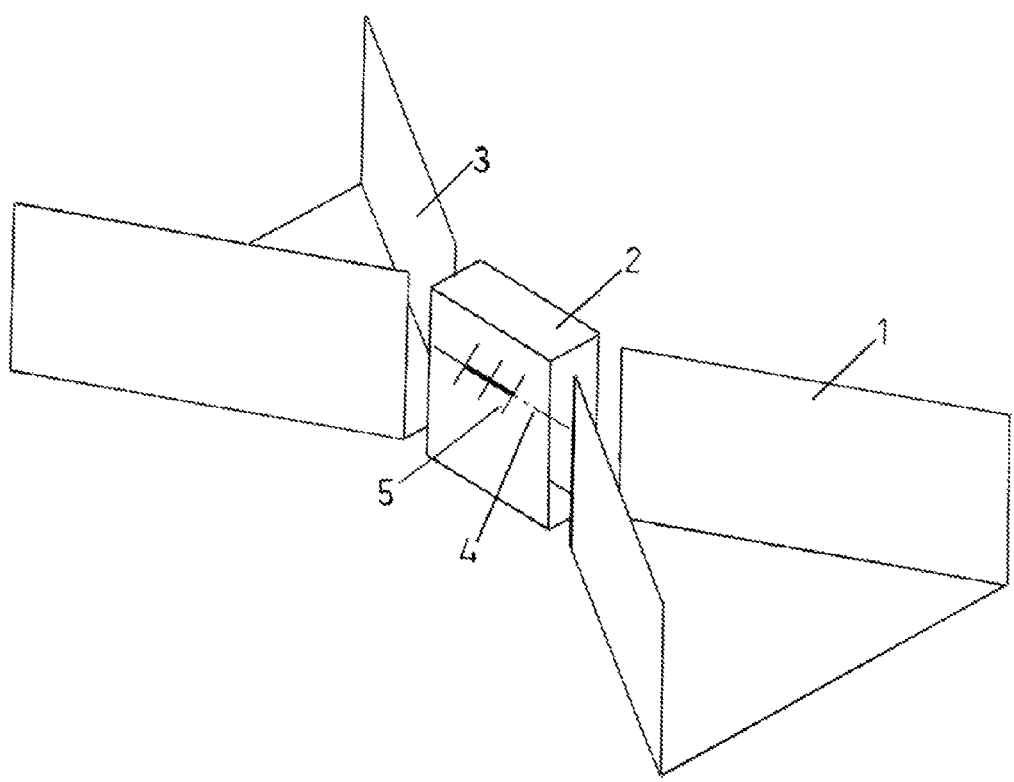
FIG. 21 is schematic of an alternative high-speed flow compartment and energy extraction component, an axial-flow water turbine, for river applications.

FIG. 21 shows an alternative energy extraction component, which can be submerged in flowing water within the high-speed flow compartment completely, for river application.

Referring to FIG. 21, all other components and equipment of the renewable energy extraction device, as seen in FIG. 3 and FIG. 4, will be incorporated to accommodate safe transmission of extracted power to the electric generator or any other rotary equipment, as desired.

Referring to FIG. 21, inlet compartment 1 is as described in FIG. 1, FIG. 3, and FIG. 4.

Referring to FIG. 21, the high-speed flow compartment 2 can be an open canal or a closed conduit with desired shape, size, and geometry. It can be made from any material(s) or coated with any material, as desired.

Referring to FIG. 21, exit compartment 3 is as described in FIG. 1, FIG. 3, and FIG. 4.

Referring to FIG. 21, high-speed flow compartment 2 is connected to the inlet compartment 1 and exit compartment 3 either directly or by the use of intermediate adaptors (not shown) that allow compartments with different end shape, size, and geometry be attached to each other.

Referring to FIG. 21, energy extraction component 5 can be a single-stage or multiple-stage axial-flow water turbine and is housed inside the high-speed flow compartment 2 in flowing water. The shaft of the energy extraction component 5 is supported by any desired number of bearings (rolling-contact bearings, sleeve bearings, or a combination of both)

that may be attached to the surfaces of the inlet, high-speed flow, and exit compartments by desired means. Bearings are not shown in FIG. 21.

Referring to FIG. 21, axis of rotation of the energy extraction component 5 is parallel with the longitudinal axis of the high-speed flow compartment 2. Flow of water through the high-speed flow compartment 2 makes the energy extraction component and its shaft, which is considered as the power shaft, rotate about the axis of rotation 4.

Referring to FIG. 21, single-stage or multistage axial-flow water turbine may be engaged with its shaft (power shaft) by welding or other means such as the use of keys or splines, as desired.

Referring to FIG. 21, rotation and power from the power shaft can be transmitted to the shaft of an electric generator (not shown) by desired means. Instead of an electric generator, the extracted power can be transmitted to pump(s), compressor(s), or any other rotary equipment as desired.

Referring to FIG. 21, multiple high-speed flow compartments, with an energy extraction component in each one, can be used with single inlet and exit compartments, for a large river. Power extracted by all individual shafts can be transmitted to a single power shaft, as desired.

11. How to Use the Invention

The renewable energy extraction device may be used to extract energy from flowing water or air.

Small scale versions of the device may be manufactured from metal and non-metal materials in the form of a floating structure, kept in a desired location, or installed temporarily or permanently, at a desired location in a river, ditch, stream, or canal to produce mechanical or electrical power from the flowing water. Large scale versions of the renewable energy extraction device may also be manufactured from metal and non-metal materials in the form of a floating structure, kept in a desired location, or installed temporarily or permanently, at a desired location over a portion or the entire span of a river, ditch, stream, or canal to produce mechanical or electrical power from a large amount of flowing water. Inlet, high-speed flow, and exit compartments of the renewable energy extraction device may also be made from concrete, built into the ground, as desired. Existing rivers, ditches, streams, and canals may be modified as desired, at a desired location, for installation of the renewable energy extraction device. Also, all or some portion of flowing water in an existing river, ditch, stream, or canal may be diverted to another canal or ditch, that is built with desired shape, size, and geometry at a desired nearby location, for installation of the renewable energy extraction device. After exiting the renewable energy extraction device, water will be directed back to downstream of the original existing river, canal, ditch, or stream.

When equipped with a rotation direction control mechanism, the renewable energy extraction device may be used for ocean application. Inlet, high-speed flow, and exit compartments of the renewable energy extraction device may be built from metal or non-metal materials and installed, temporarily or permanently, at a desired location in an ocean, sea, lake, or pond. Similarly, some or all of the inlet, high-speed flow, and exit compartments may be built from concrete and into the ground, at a desired location in the ocean, sea, lake, or pond. The renewable energy extraction device may also be built from metals and non-metals materials, in the form of a floating structure or a barge-like structure that is anchored in a desired location by desired means.

With an appropriate energy extraction component as well as inlet, high-speed flow, and exit compartments, the renewable energy extraction device may be used for air application. The renewable energy extraction device may be installed, temporarily or permanently, in a desired location. It may be installed on a stationary offshore structure or on a barge-like floating structure, as desired. When foldable structures and sheets are used in building the renewable energy extraction device, a simplified version of the device can be carried in a portable, compact form for setting up at a desired location in a short time.

The power produced by a renewable energy extraction device may be used to drive an electric generator, pump, compressor, or any other rotary equipment as desired.

When an electric generator is used, the renewable energy extraction device can provide electricity to a desired region or to a power grid, by desired means.

When the renewable energy extraction device is used to drive a pump, the pump may transfer water from a low-elevation reservoir(s) to a high-elevation reservoir(s) that are installed at a desired nearby location. Conduit(s) with desired size, shape, geometry, and material will be used to allow flow of water, by gravity, from the high-elevation reservoir(s) to a water turbine(s) and from the turbine(s) to the low-elevation reservoir(s), as desired. The energy extracted by the turbine(s) is transmitted to an electric generator(s) to generate electricity. This provision allows storing energy, which is extracted by the renewable energy extraction device, in the form of potential energy in the high-elevation reservoir and using the water turbine and electric generator to convert the stored potential energy to electricity, at a desired steady rate. All necessary equipment and instrumentation will be used to control water level in the high-elevation and low-elevation reservoirs, as desired. Instead of using single large high-elevation and low-elevation reservoirs, multiple small high-elevation and low-elevation reservoirs may be used. All the high-elevation reservoirs will be connected to each other by conduits, necessary equipment, and instrumentation, as desired. Similarly, all the low-elevation reservoirs will be connected to each other by conduits, necessary equipment, and instrumentation, as desired.

Renewable energy extraction device that is the subject of this invention, is an economical, affordable, and relatively simple device that can capture large amounts of flowing water (from ocean, sea, lake, pond, river, stream, ditch, or a canal) or atmospheric air to produce mechanical or electrical power, at a significant rate, economically. Compared to the existing huge wind turbines or hydroelectric power plants, the renewable energy extraction device can be built with much less cost and with less sophisticated manufacturing facilities. Instead of increasing the size of a wind or water turbine to produce power at a significant rate, the renewable energy extraction device captures large amounts of flowing water or atmospheric air, increases the speed of the captured water or air by reducing the flow cross sectional area in the flow direction, in a desired pattern, and utilizes a relatively small size energy extraction component (paddle wheel, water turbine, or axial-flow air turbine) to extract energy of water or air that is flowing at a high speed through a relatively small cross sectional area. Because of the small size of its energy extraction component, it is much easier to build, operate and maintain the renewable energy extraction device. Also, because of the relatively small size of the energy extraction component, it can be manufactured in a central facility and shipped to the site of installation easily. Furthermore, the inlet, high-speed flow, and exit compartments of the renewable energy extraction device can be built on the site of installation or at any local facility, if desired. Therefore, most of the components of the renewable energy extraction device can be built locally, with no need to sophisticated facilities, with affordable cost, and create quality jobs for local communities.

Thus it will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A renewable energy extraction device for river application, comprising:
   (a) an inlet compartment, with a relatively large opening and reducing cross sectional area in the flow direction, capable of capturing all or a portion of the river flow rate, and increasing speed of the captured water as it flows through the inlet compartment;
   (b) a high-speed flow compartment which receives high-speed flowing water from the inlet compartment;
   (c) an energy extraction component including a wheel rotor, wheel structure, and multiple paddles to extract energy from the high-speed water that flows through the high-speed flow compartment;
   (d) a power shaft which is engaged with the wheel rotor by keys, or other similar means, and receives the extracted energy in the form of rotational mechanical energy;
   (e) an exit compartment which receives water from the high-speed flow compartment and releases it to the original source of water downstream;
   (f) rolling-contact bearings, sleeve bearings, or a combination of both, that may be attached to the walls of the inlet, high-speed flow, or exit compartments, to support the rotating shafts;
   (g) flow restriction device(s), attached to any of the inlet, high-speed flow, or exit compartments to control flow of water through the compartments;
   (h) an electric generator, to receive the rotational mechanical energy of the power shaft and convert it to electrical power;
   (i) a brake system, for stopping the rotating shafts that are all connected to each other;
   (j) a transmission system, to adjust rotational speed of rotating shafts;
   (k) a flywheel, to store the rotational energy of the power shaft and minimize fluctuation in its rotational speed;
   (l) spacer shafts, to connect two adjacent shafts;
   (m) couplings, to connect two adjacent shafts;
   (n) means to control or prevent axial movements of rotating shafts;
   (o) screening devices, to be attached to the inlet and exit compartments to prevent debris or any other undesired particles and objects from passing through;
   (p) a lower structural platform to which all inlet, high-speed flow, and exit compartments are attached;
   (q) an upper structural platform, on which all equipment and instrumentation can be mounted and provides a working area for crew; and
   (r) a structure, connecting lower platform to the upper platform.

2. A renewable energy extraction device according to claim 1, wherein said lower and upper platforms may be built from metal, non-metal materials, concrete, or a combination of them, and fixed into the ground.

3. A renewable energy extraction device according to claim 1, wherein said lower and upper platforms can be built on a floating structure, with means to keep the floating structure in place while allowing it to move up and down as water level changes, and aligned with the flow direction.

4. A renewable energy extraction device according to claim 1, wherein said single inlet and exit compartments are used with multiple high-speed flow compartments and energy extraction components.

5. A renewable energy extraction device according to claim 1, wherein said energy extraction component is a single-stage or multiple-stage axial-flow water turbine submerged in water that is flowing through the high-speed flow compartment, with means to transmit extracted power to other components that are mounted on the upper platform.

6. A renewable energy extraction device according to claim 5, wherein said single inlet and exit compartments are used with multiple high-speed flow compartments and energy extraction components.

7. A rotation direction control mechanism for ocean application, comprising:
   (a) a power shaft, which supports the energy extraction component and receives the extracted energy in the form of rotational mechanical energy;
   (b) an energy extraction component including a wheel rotor which rotates idle (freely) relative to the power shaft, wheel structure, and multiple paddles, to extract energy from the high-speed water that flows through the high-speed flow compartment;
   (c) a ratchet-like cylinder, that is concentric with the power shaft and engaged with it by keys or other similar means;
   (d) a slotted cylinder, which is concentric with the power shaft but rotates idle (freely) relative to it;
   (e) two extended-slotted cylinders, that are concentric with the power shaft and can rotate idle (freely) relative to it, and are attached to the wheel rotor or wheel structure or both, one on each side, by fasteners;
   (f) an extended ratchet-like cylinder, that is concentric with the power shaft but rotates idle (freely) relative to it;
   (g) a slotted disk that is concentric with the cylindrical section of the extended ratchet-like cylinder, but rotates idle (freely) relative to it;
   (h) an internally-geared cylinder, that is concentric with the power shaft and engaged with it by keys or other similar means;
   (i) an inner gear that is concentric with the second cylindrical section of the extended ratchet-like cylinder, and is engaged with it by keys or other similar means;
   (j) peripheral gear, used in multiple quantities, to transfers rotation and power from the inner gear to the geared section of the internally-geared cylinder;
   (k) peripheral gear support, used in multiple quantities, which could be an axle or spindle, to support the peripheral gear;
   (l) synchronizer, used in multiple quantities, that could be an axle or stud bolt with its associated nuts and washers, to connect an extended-slotted cylinder to the slotted cylinder or the slotted disk;
   (m) power transmission element, used in multiple quantities, that could be an axle or stud bolt with its associated nuts and washers, that can slide on curved surfaces of the ratchet-like cylinder or extended ratchet-like cylinder while moving up and down in slots of the slotted disk, slotted cylinder, and extended slotted cylinder;
   (n) noise absorbing component, used in multiple quantities, which could be a sleeve (jacket), from plastic, rubber, or any other noise absorbing material(s), to be used around some or all surfaces of the power transmission elements to absorb noise of contact between contacting components;
   (o) spring, used in multiple quantities, attached to both the ratchet-like cylinder and the extended-ratchet-like cylinder to keep the sliding power transmission elements always in contact with surfaces of the ratchet-like cylinder and the extended-ratchet-like cylinder;

(p) means to control or prevent axial movements of all components; and (q) rolling-contact bearings, sleeve bearings, or a combination of both, to support the rotating shafts.

8. A rotation direction control mechanism according to claim 7, wherein said extended ratchet-like cylinder and inner gear are combined to make a single piece, by directly cutting gear teeth on the cylindrical section of the extended ratchet-like cylinder, with the combined single piece be engaged with the peripheral gears.

9. A renewable energy extraction device for ocean application, comprising:

(a) an inlet compartment, with a relatively large opening and reducing cross sectional area in the direction of the incoming flow, capable of capturing a relatively large amount of flowing water and increasing speed of the captured water as it flows through the inlet compartment;

(b) a high-speed flow compartment which receives high-speed flowing water from the inlet compartment;

(c) a rotation direction control mechanism, which also includes a power shaft, wheel rotor, wheel structure, and multiple paddles to extract energy from the high-speed water that flows through the high-speed flow compartment, and produce rotation in only one direction independent of the direction of flow of water through the high-speed flow compartment;

(d) an exit compartment which receives water from the high-speed flow compartment and releases it to the original source of water downstream;

(e) rolling-contact bearings, sleeve bearings, or a combination of both, that may be attached to the walls of the inlet, high-speed flow, or exit compartments, to support the rotating shafts;

(f) flow restriction device(s), attached to any of the inlet, high-speed flow, or exit compartments to control flow of water through the compartments;

(g) an electric generator, to receive the rotational mechanical energy of the power shaft and convert it to electrical power;

(h) a brake system, for stopping the rotating shafts that are all connected to each other;

(i) a transmission system, to adjust rotational speed of rotating shafts;

(j) a flywheel, to store the rotational energy of the power shaft and minimize fluctuation in its rotational speed;

(k) spacer shafts, to connect two adjacent shafts;

(l) couplings, to connect two adjacent shafts;

(m) means to control or prevent axial movements of rotating shafts;

(n) screening devices, to be attached to the inlet and exit compartments to prevent debris or any other undesired particles and objects from passing through;

(o) a lower structural platform to which all inlet, high-speed flow, and exit compartments are attached;

(p) an upper structural platform, on which all equipment and instrumentation can be mounted and provides a working area for crew; and (q) a structure, connecting lower platform to the upper platform.

10. A renewable energy extraction device according to claim 9, wherein said lower and upper platforms may be built from metal, non-metal materials, concrete, or a combination of them, and fixed into the ground.

11. A renewable energy extraction device according to claim 9, wherein said lower and upper platforms can be built on a floating structure, with means to keep the floating structure in place while allowing it to move up and down as water level changes, and aligned with the flow direction.

12. A renewable energy extraction device according to claim 9, wherein said single inlet and exit compartments are used with multiple high-speed flow compartments and rotation direction control mechanisms.

13. A renewable energy extraction device for air application, comprising:

(a) an inlet compartment, with a closed contour except at its inlet and outlet, with a relatively large opening and with reducing cross sectional area in the flow direction, rigid or foldable, built from rigid or foldable materials, capable of capturing relatively large amounts of flowing atmospheric air, increasing speed of the captured air as it flows through the inlet compartment;

(b) a high-speed flow compartment, rigid or foldable, built from rigid or foldable materials with a closed contour except at its inlet and outlet, which receives high-speed flowing air from the inlet compartment for extraction of its energy;

(c) an exit compartment, rigid or foldable, built from rigid or foldable materials, which releases the captured air back to the atmosphere after its energy is extracted;

(d) an energy extraction component, a single-stage or multistage axial-flow air or wind turbine, with its associated shaft that is considered as the power shaft, to extract energy of the captured air and convert it to the rotational mechanical energy on the power shaft;

(e) flow restriction device(s), attached to any of the inlet, high-speed flow, or exit compartments, to control flow of air through the compartments;

(f) an electric generator to convert the mechanical energy of the power shaft to electrical power;

(g) a brake system, for stopping the rotating shafts that are all connected to each other;

(h) a transmission system, to adjust rotational speed of rotating shafts;

(i) a flywheel, to store the rotational energy of the power shaft and minimize fluctuation in its rotational speed;

(j) spacer shafts, to connect two adjacent shafts;

(k) couplings, to connect two adjacent shafts;

(l) screening devices, to be attached to the inlet and exit compartments to prevent debris or any other undesired particles and objects from passing through; and (m) a rigid or foldable frame or structure on which all of the compartments and components of the renewable energy extraction device, and their required instrumentation, are mounted.

14. A renewable energy extraction device according to claim 13, wherein a central duct with multiple inlet compartments and check valves (directional valves) are used on a stationary structure to capture air that may approach the renewable energy extraction device from any direction, with the central duct supplying the air captured by all inlet compartments to the single high-speed flow compartment.

15. A renewable energy extraction device according to claim 13, wherein two units of said renewable energy extraction device are mounted back-to-back on a rigid or foldable rotary structure, with attaching rigid or foldable sheets to the rotary structure to increase the magnitude of the wind forces acting on it, thus making the rotary structure rotate by wind forces and align itself with the wind direction, and with means to lock (anchor) the rotary structure to a stationary structure at a desired angle.

16. A renewable energy extraction device according to claim 15, wherein said rotary structure can rotate on a rigid or foldable stationary structure that can be secured to the ground or a foundation by fasteners, ropes, cables, chains, or wires, and with addition of lubricated or non-lubricated flat surfaces, rollers, or motorized or manually driven wheels, that can be attached to the stationary and rotary structures, to allow the rotary structure rotate on the stationary structure easily in order to align itself with the wind direction.

17. A renewable energy extraction device according to claim 16, wherein an electric generator sharing mechanism is added so the two renewable energy extraction device units can transmit their power to a single electric generator.

18. A method of generating power according to claim 14, wherein a rotation direction control mechanism is used to allow power generation in ocean applications.

19. A method of generating power according to claim 14, wherein two renewable energy extraction device units are used with stationary and rotary structures, with or without the electric generator sharing mechanism, and with or without a central duct with multiple inlet compartments and check valves, to allow power generation in air applications.

20. A method of generating power for river applications, comprising the steps of:
(a) using an inlet compartment with a relatively large opening to capture a relatively large amount of flowing water, increase speed of the captured water that is flowing through the inlet compartment by reducing the cross sectional area of the inlet compartment in the direction of the incoming flow;
(b) directing the captured water, that leaves the inlet compartment with a high speed, to a high-speed flow compartment for extraction of its energy;
(c) using an energy extraction component, with its associated shaft (considered as the power shaft), within the high-speed flow compartment to extract energy of the high-speed water and convert it to the rotational mechanical energy on the power shaft;
(d) directing the captured water, after energy extraction, to an exit compartment for its release to the original source of water at a downstream location;
(e) using flow restriction means to control magnitude of flow rate of water that passes through any of the inlet, high-speed flow, and exit compartments;
(f) using screening means, to be attached to the inlet, high-speed flow, and exit compartments, to prevent undesired particles and objects that might be carried by the flowing water from entering any of the inlet, high-speed flow, and exit compartments;
(g) transmitting the rotational mechanical energy of the power shaft to an electric generator, pump, compressor, or any other rotary equipment;
(h) using the electrical power of the electric generator for local needs or for delivery to a power grid;
(i) using a brake system, for stopping the rotating shafts that are all connected together;
(j) using a transmission system, to adjust rotational speed of rotating shafts;
(k) using a flywheel, to store the rotational energy of the power shaft and minimize fluctuation in its rotational speed;
(l) using spacer shafts, to connect two adjacent shafts;
(m) using couplings, to connect two adjacent shafts; and
(n) using universal joints to transmit power if adjacent shafts do have the same axes of rotation.

* * * * *